(12) United States Patent
Asjadi

(10) Patent No.: US 7,418,026 B2
(45) Date of Patent: Aug. 26, 2008

(54) RECEIVER FOR A MULTI-CARRIER MODULATED SYMBOL

(75) Inventor: Hosein Asjadi, Guildford (GB)

(73) Assignee: Sony United Kingdom Limited, Weybridge (GB)

( * ) Notice: Subject to any disclaimer, the term of this patent is extended or adjusted under 35 U.S.C. 154(b) by 871 days.

(21) Appl. No.: 10/434,301

(22) Filed: May 7, 2003

(65) Prior Publication Data

US 2003/0210749 A1 Nov. 13, 2003

(30) Foreign Application Priority Data

May 9, 2002 (GB) .................... 0210617.7
May 9, 2002 (GB) .................... 0210630.0

(51) Int. Cl.
*H04B 1/00* (2006.01)

(52) U.S. Cl. ...................................... 375/136

(58) Field of Classification Search ................. 375/136, 375/144, 147, 148, 316, 346
See application file for complete search history.

(56) References Cited

U.S. PATENT DOCUMENTS

| | | | |
|---|---|---|---|
| 5,410,264 A | | 4/1995 | Lechleider |
| 5,497,398 A | | 3/1996 | Tzannes et al. |
| 5,875,199 A | * | 2/1999 | Luthi ........................ 714/780 |
| 6,771,591 B1 | * | 8/2004 | Belotserkovsky et al. ... 370/210 |
| 2001/0012762 A1 | | 8/2001 | Kuehn et al. |
| 2002/0146063 A1 | * | 10/2002 | Gorokhov et al. ........... 375/148 |
| 2003/0076900 A1 | * | 4/2003 | Magee et al. ................ 375/316 |
| 2003/0081695 A1 | * | 5/2003 | Eilts et al. .................. 375/316 |
| 2003/0142764 A1 | * | 7/2003 | Keevill et al. .............. 375/341 |

FOREIGN PATENT DOCUMENTS

EP 0 930 719 7/1999

(Continued)

*Primary Examiner*—David C. Payne
*Assistant Examiner*—Aslan Ettehadieh
(74) *Attorney, Agent, or Firm*—Oblon, Spivak, McClelland, Maier & Neustadt, P.C.

(57) ABSTRACT

A receiver for receiving a multi-carrier modulated symbol is arranged to suppress a burst noise signal which may have been induced in the symbol. The symbol includes a plurality of pilot carriers as well as a plurality of data bearing carriers. The receiver comprises a burst noise detection processor operable to detect the temporal position of the burst noise signal which may have corrupted the symbol within a period occupied by the symbol, and a channel estimation processor operable to generate a decimated noise signal corresponding to the burst noise, from the recovered pilot carriers. An inverse Fourier transform of the decimated noise signal provides a plurality of estimated versions of the burst noise signal. A noise signal processor is operable to generate an estimate of the burst noise signal by identifying one of the plurality of estimated burst noise versions at the detected temporal location of the burst noise signal. The noise signal processor may be operable to set the signal samples other than the identified estimate of the burst noise signal to zero and to perform a Fourier transform, to provide a frequency domain version of the burst noise signal, thereby interpolating the decimated noise signal. The frequency domain noise signal estimate may be cancelled from the symbol by a noise cancellation processor in the frequency domain, before data is recovered from the symbol. The receiver finds application for Digital Video Broadcasting in which COFDM is employed.

36 Claims, 14 Drawing Sheets

Time Domain Burst Noise Suppression Processor

Frequency Domain Burst Noise Suppression Processor

FOREIGN PATENT DOCUMENTS

| | | |
|---|---|---|
| EP | 1 043 874 | 10/2000 |
| EP | 1 176 750 | 1/2002 |
| EP | 1 178 642 | 2/2002 |
| EP | 1 180 851 | 2/2002 |
| WO | WO 97 40587 | 10/1997 |

* cited by examiner

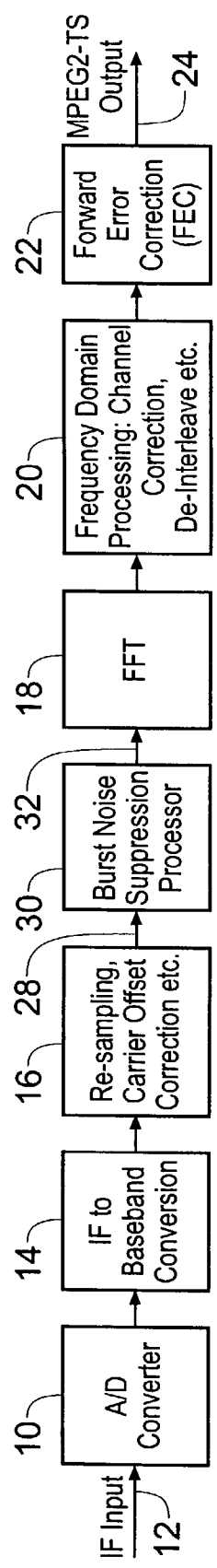
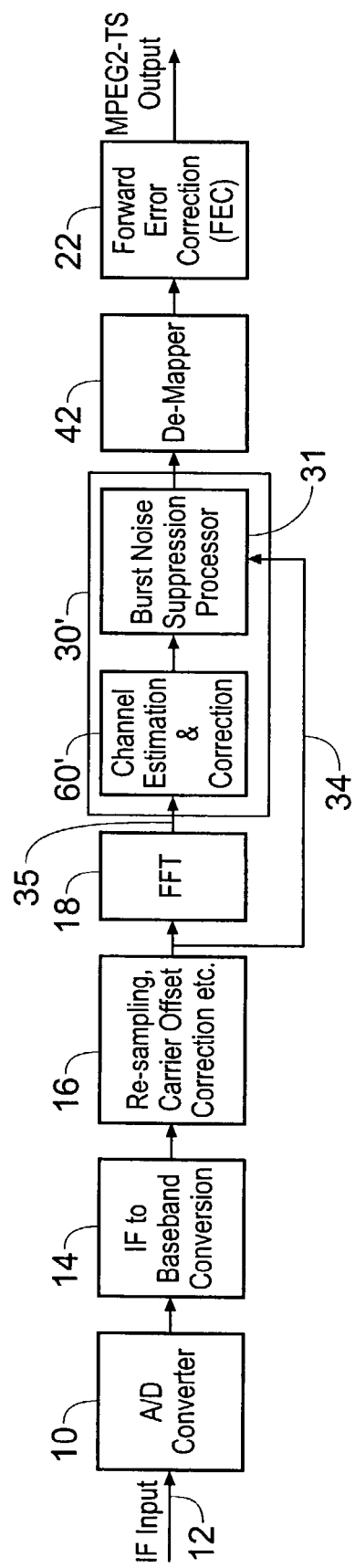
Fig. 2a: Simplified Block Diagram of a Receiver with Time Domain Burst Noise Suppression Processor
Fig. 2b: Simplified Block Diagram of a Receiver with Frequency Domain Burst Noise Suppression Processor

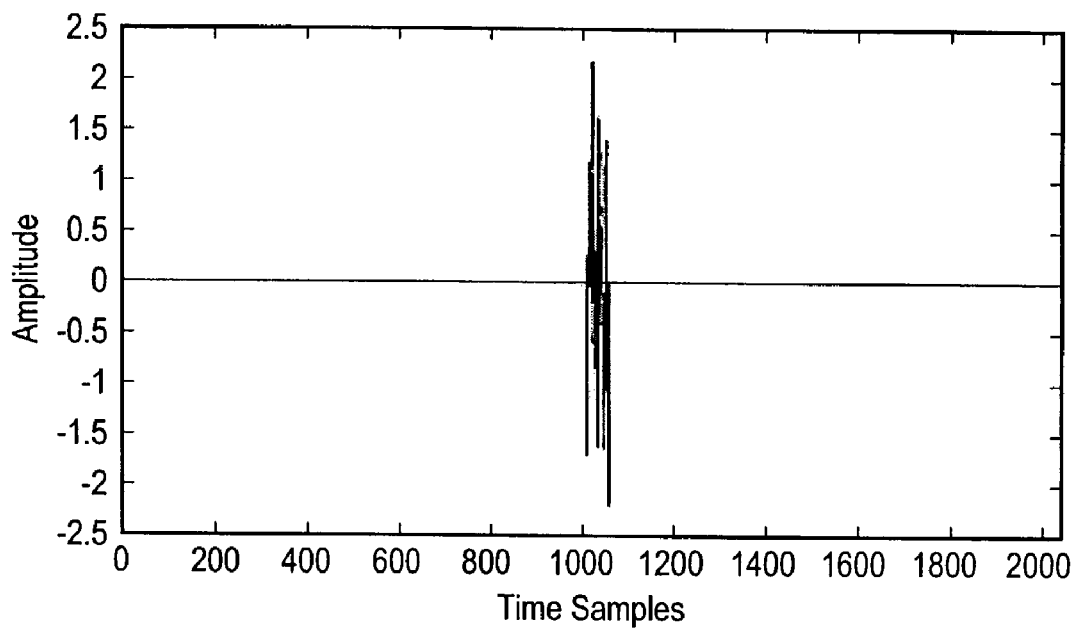
Fig. 3a: Burst Duration of 5 μsec; x(t)
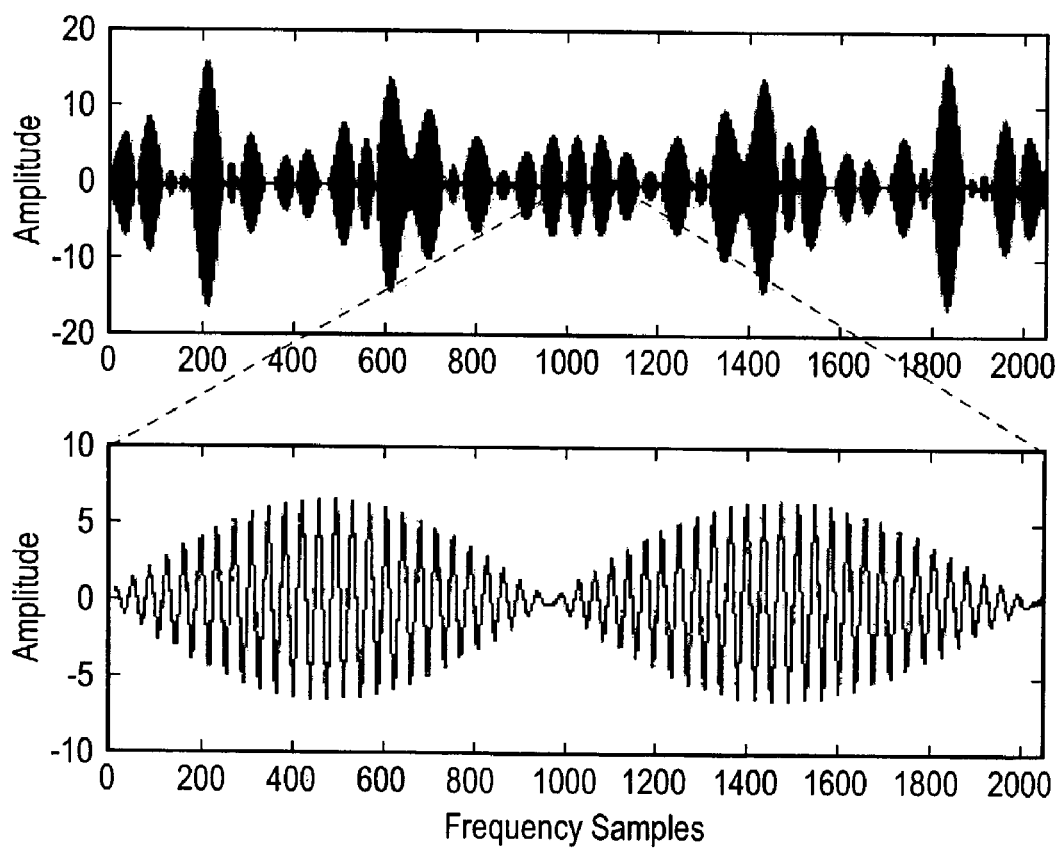
Fig. 3b: Burst Duration of 5 μsec; Real Part of X(f)

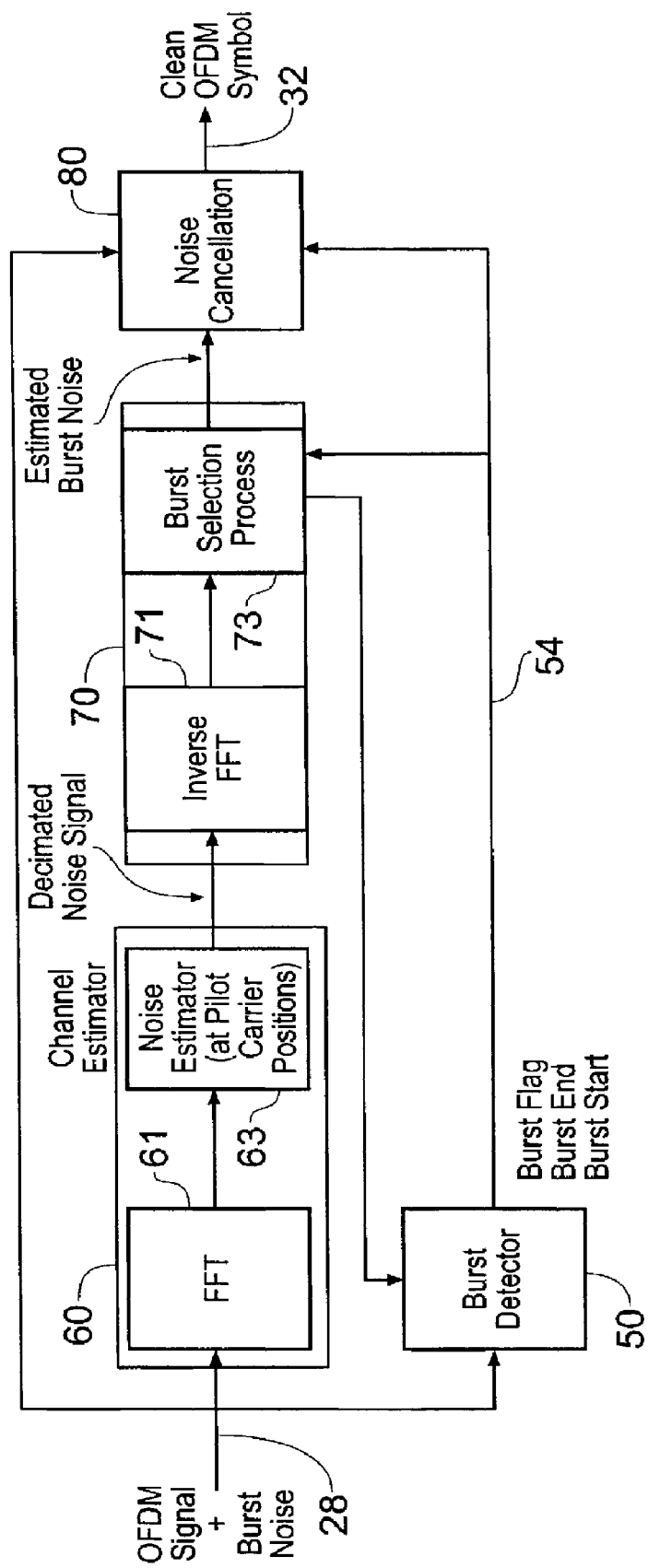
Fig. 4a: Time Domain Burst Noise Suppression Processor

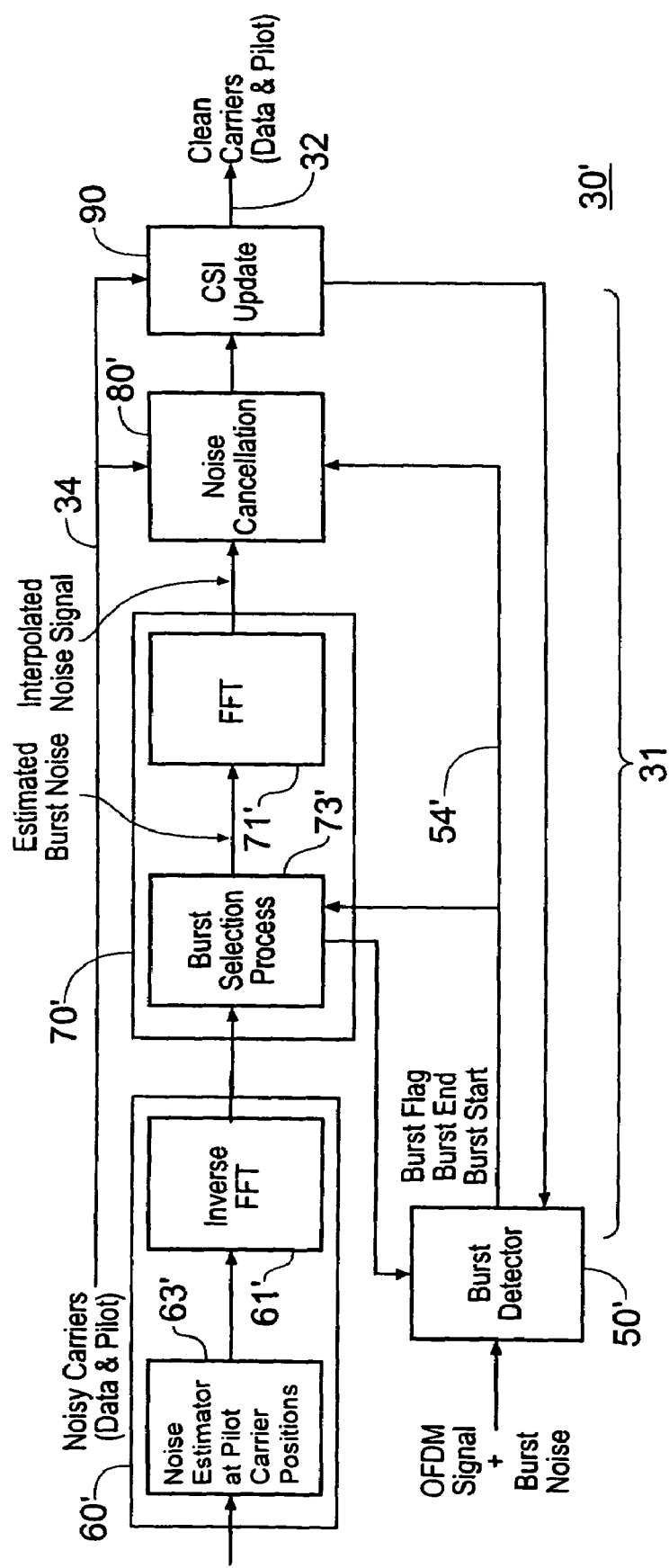
Fig. 4b: Frequency Domain Burst Noise Suppression Processor

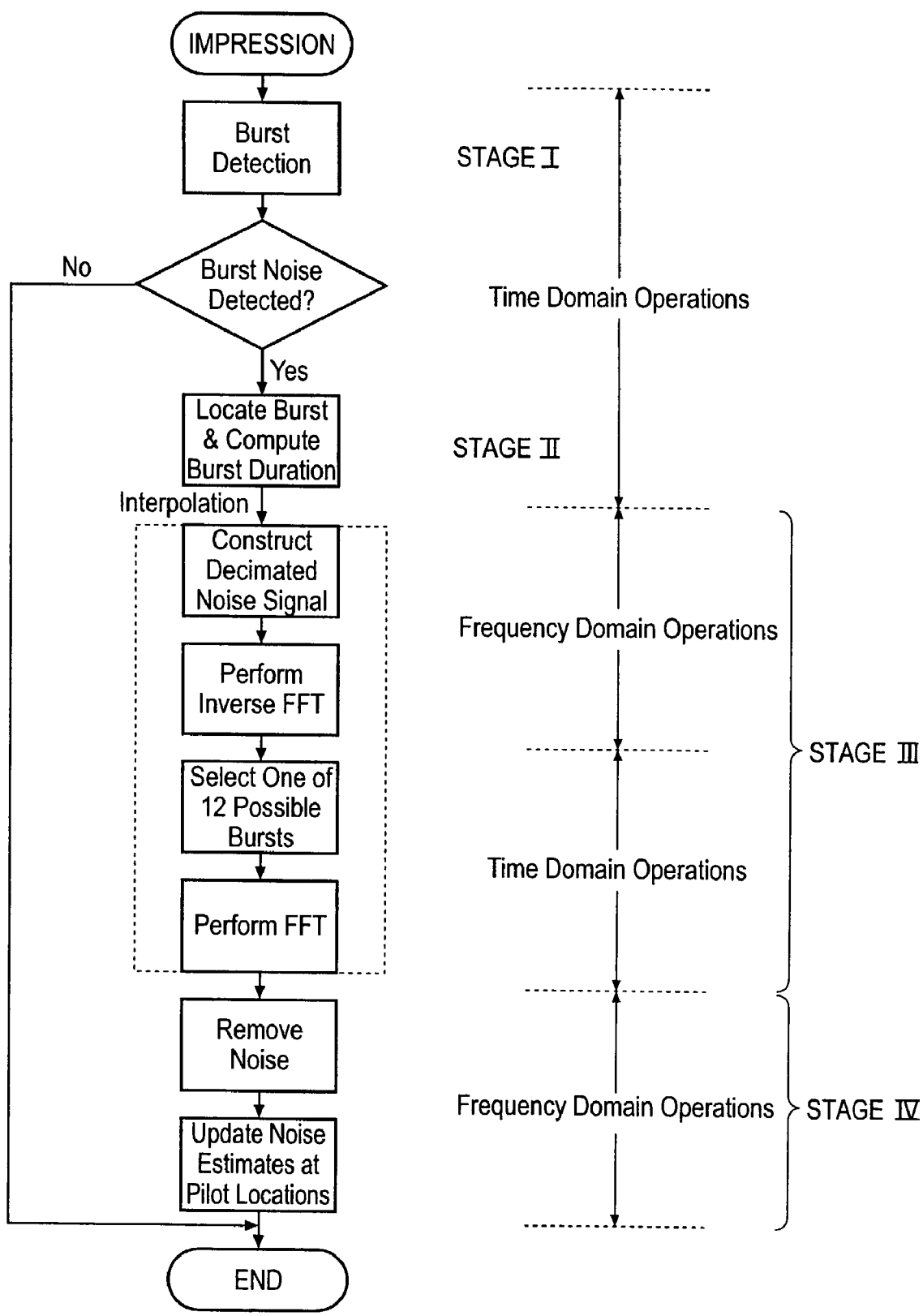
Fig. 5: Flow Chart of IMPRESSION

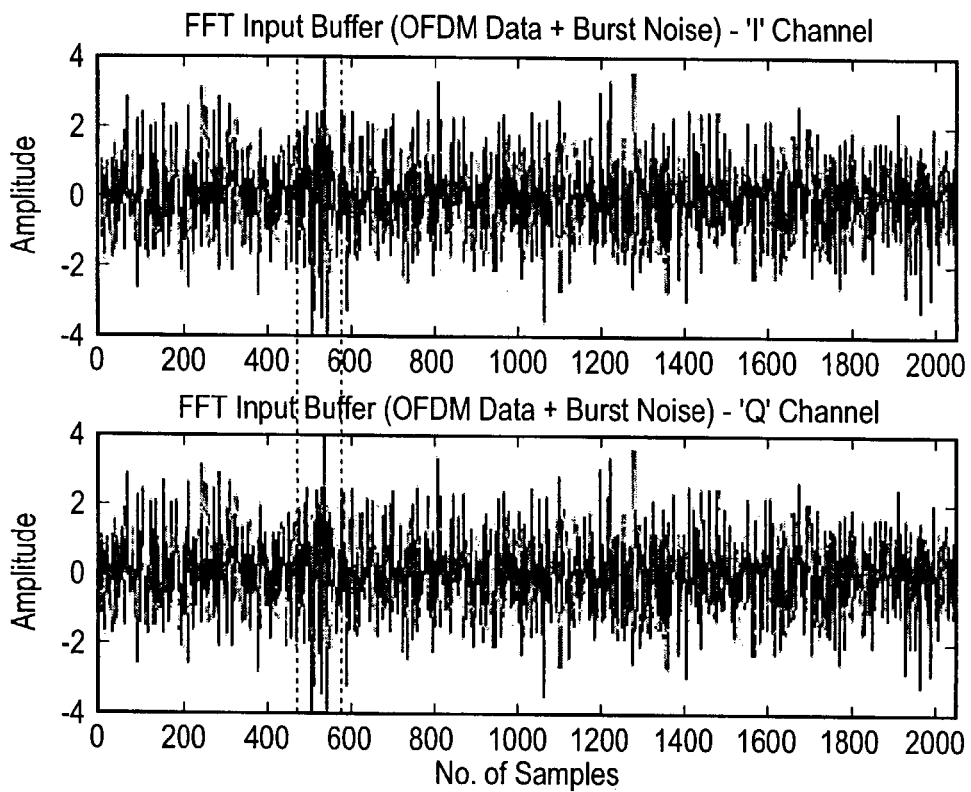
Fig. 6: FFT Input Buffer with a Burst Noise of 50 Sample Duration
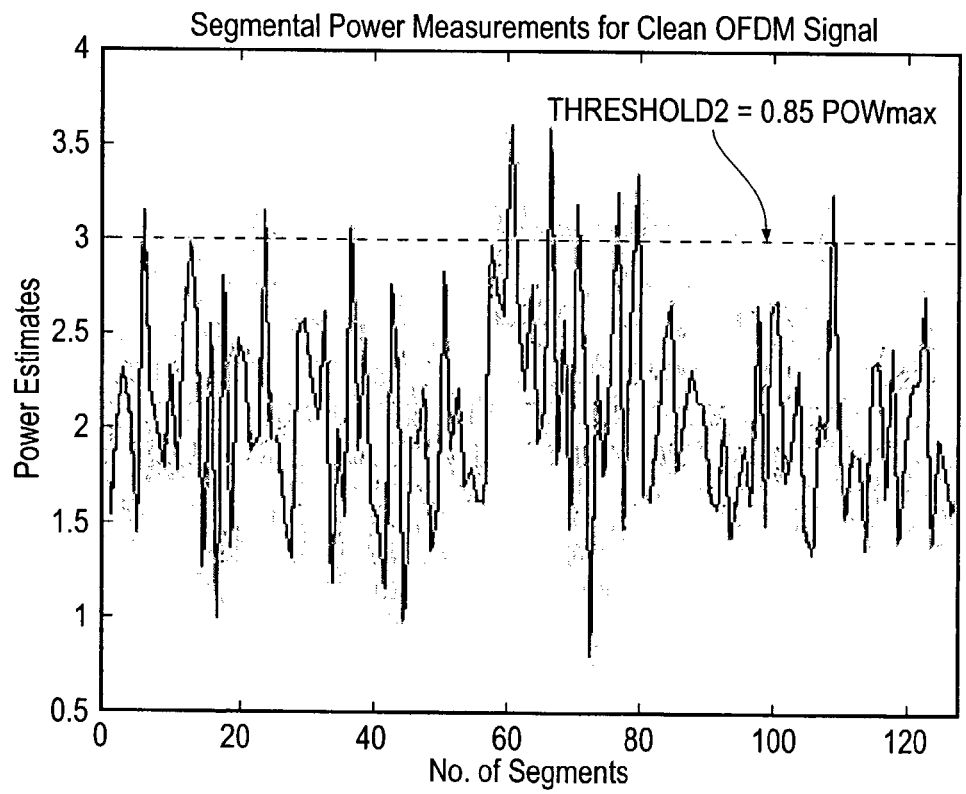
Fig. 7: Segmental Power Measurements for Clean Signal

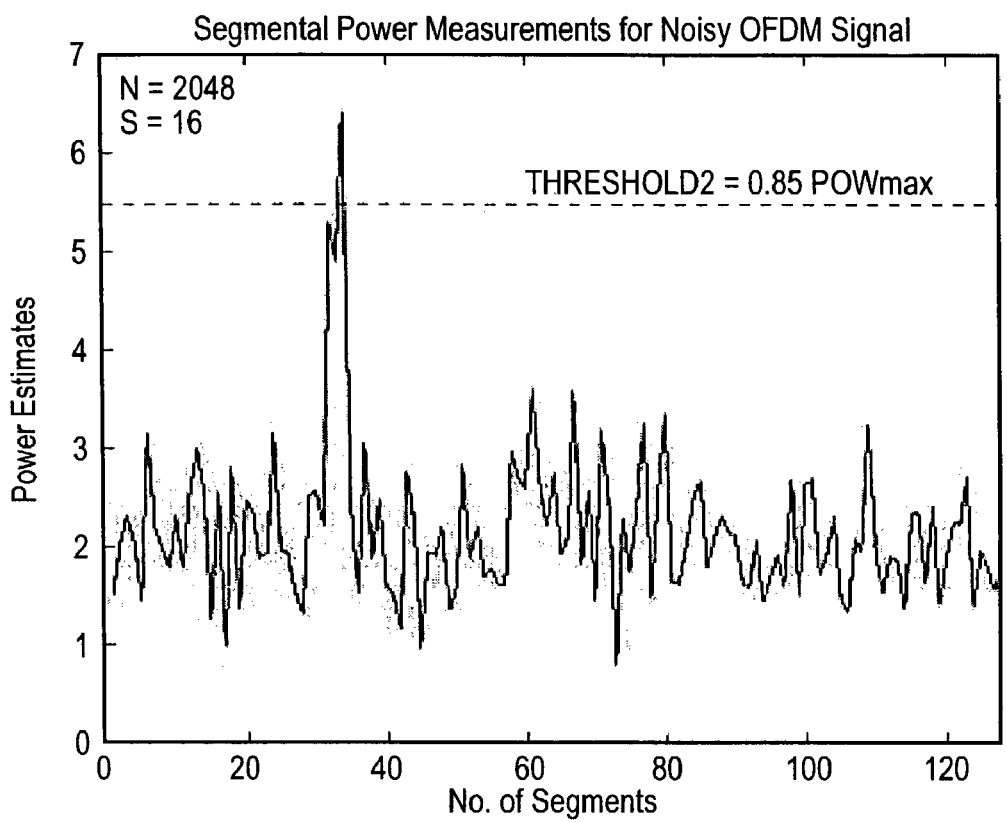
Fig. 8: Segmental Power Measurements for Noisy OFDM Signal
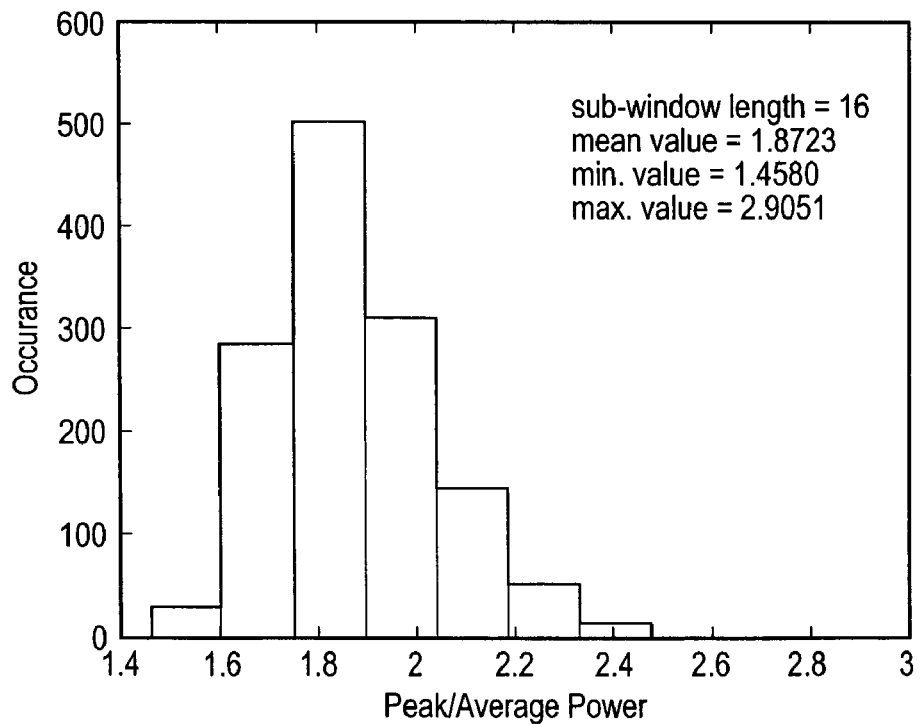
Fig. 9: Histogram of Peak-to-Average Power Ratio for Clean Signal

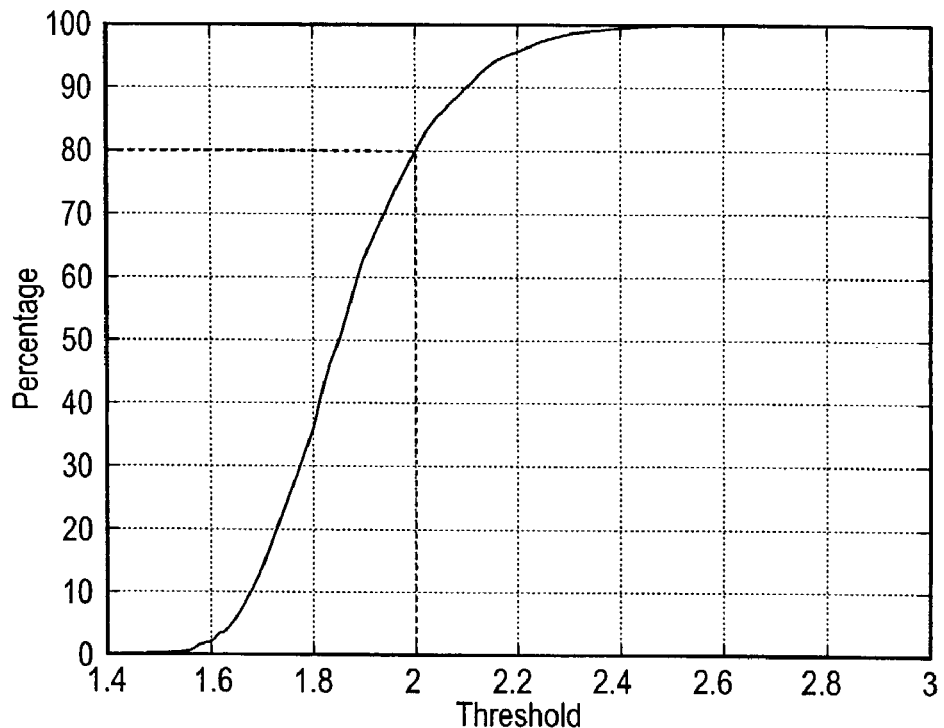
Fig. 10: Percentage of Peak-to-Average Power Ratio vs. Threshold (clean signal)
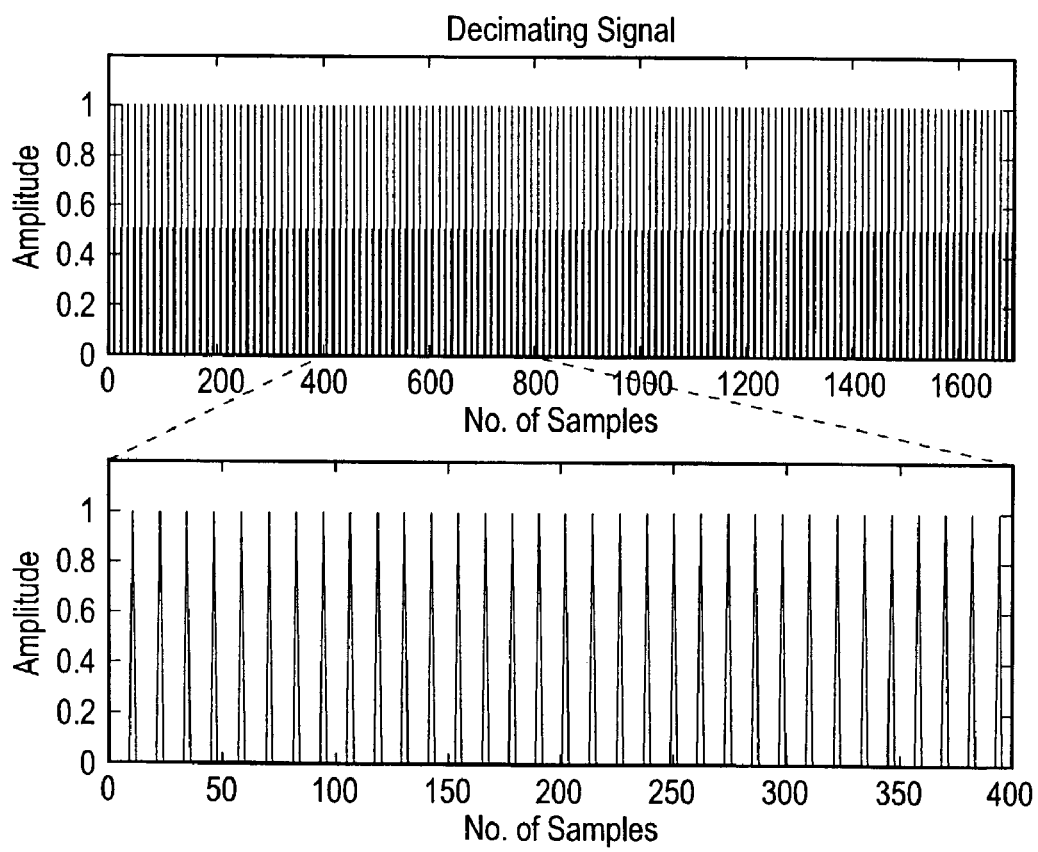
Fig. 11: A Typical Decimating Signal, D(f) (length = 1705)

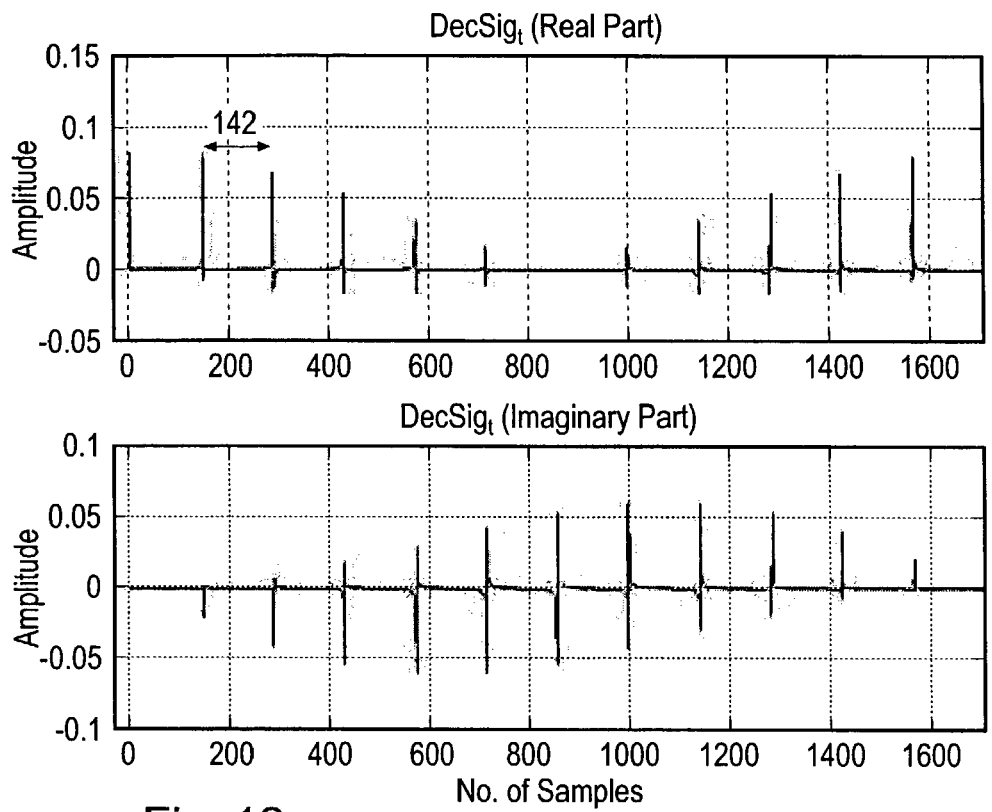
Fig. 12: Time Domain Representation of Decimating Signal, d(t)
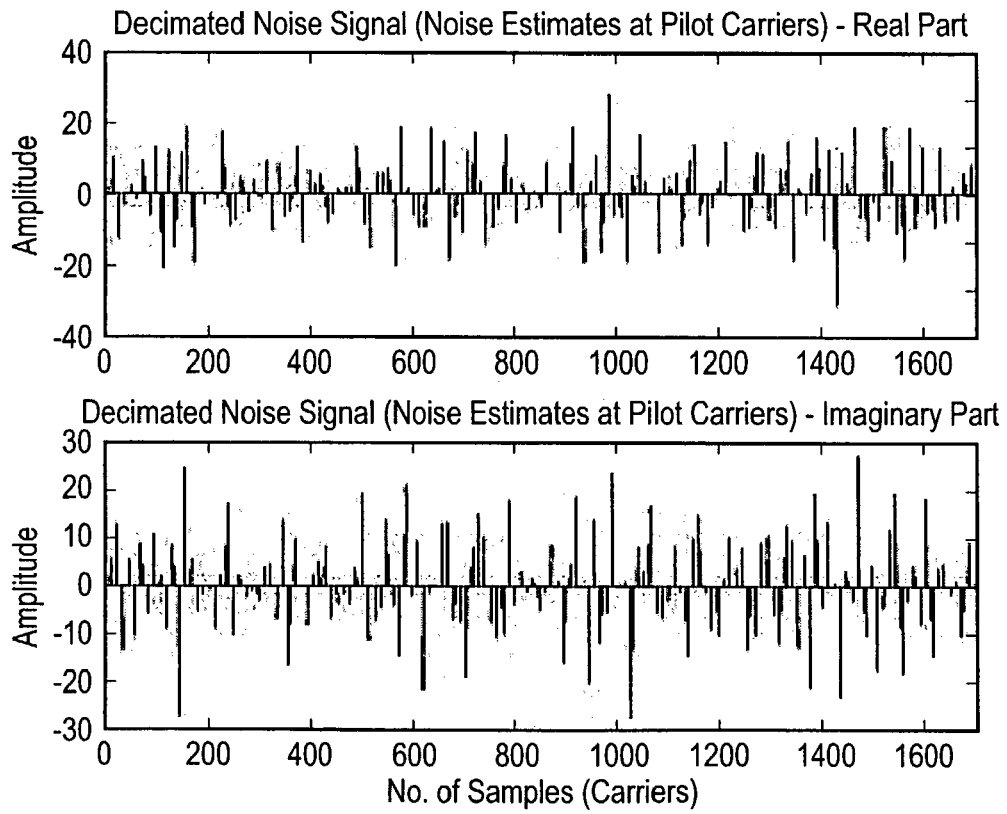
Fig. 13: Decimated Noise Signal (Noise Estimates at Pilot Carriers)

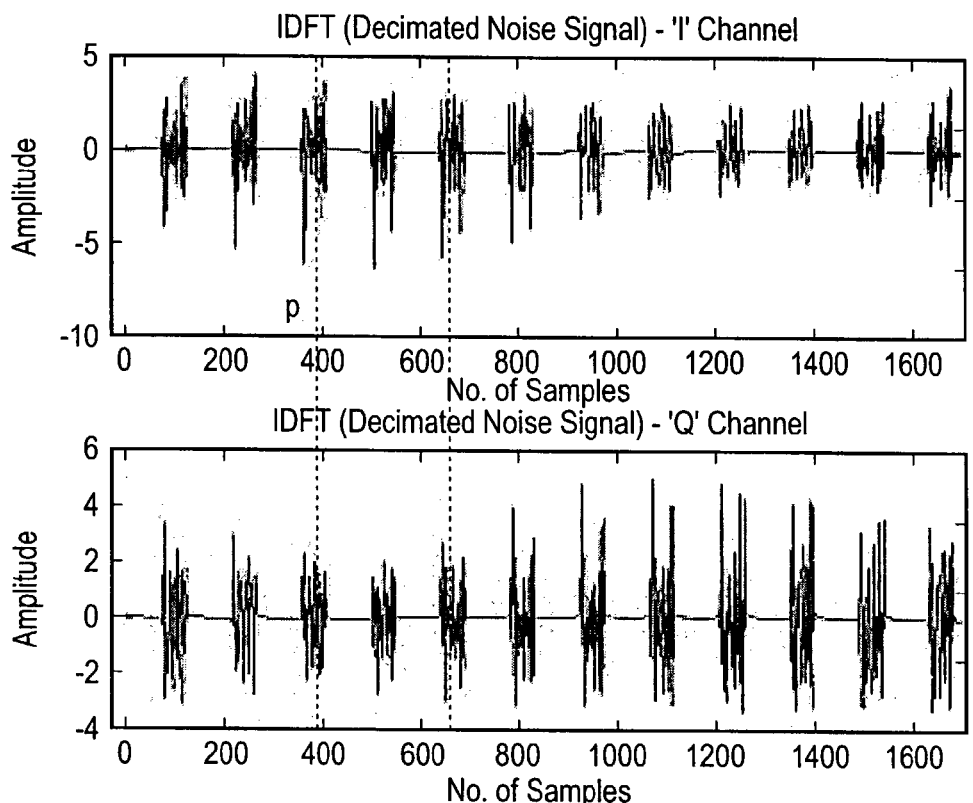
Fig. 14: Time Domain Representation of Decimated Noise Signal
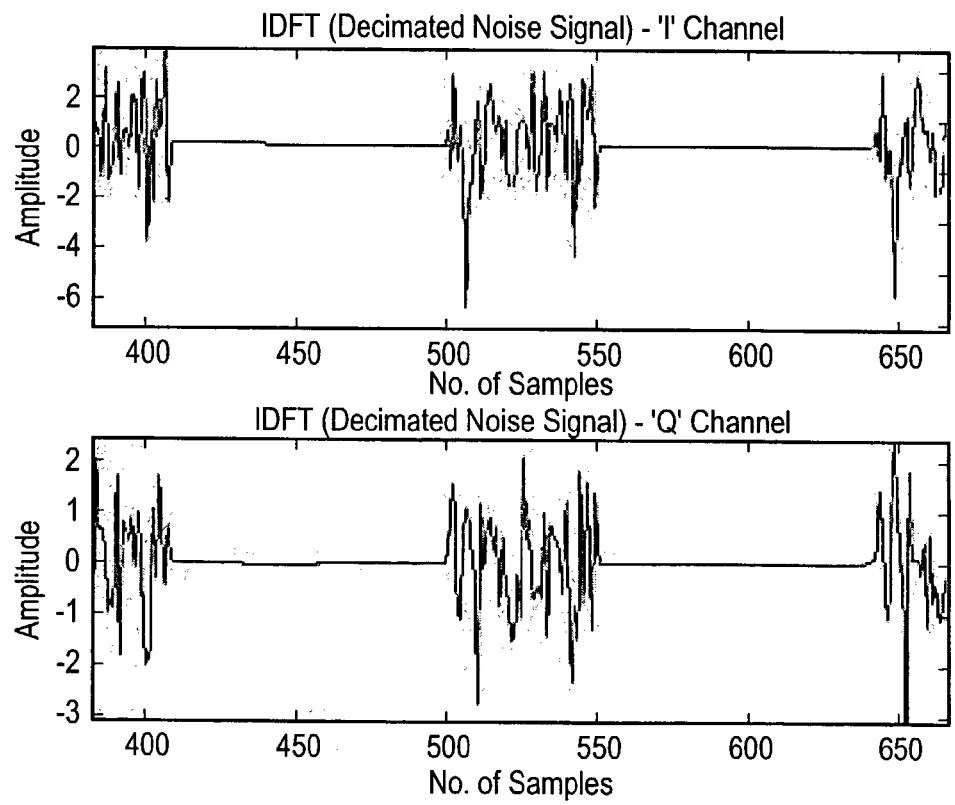
Fig. 15: Selected Segment (based on Information extracted in Stage II)

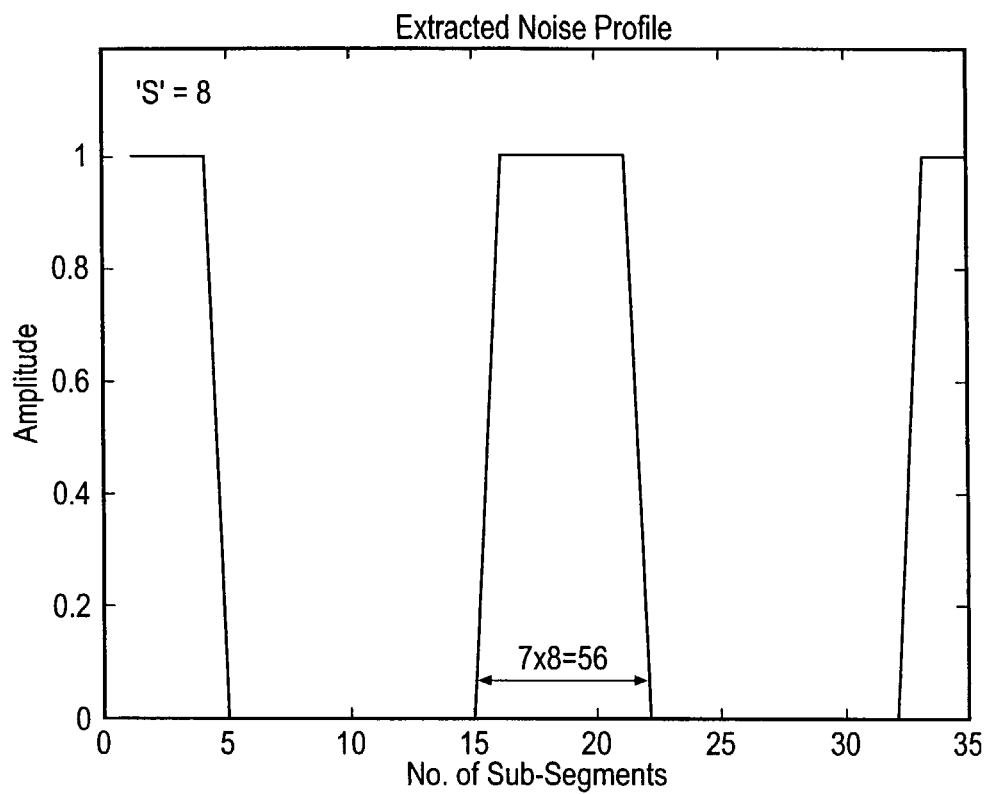
Fig. 17: Extracted Noise Profile (When Burst Noise Present)
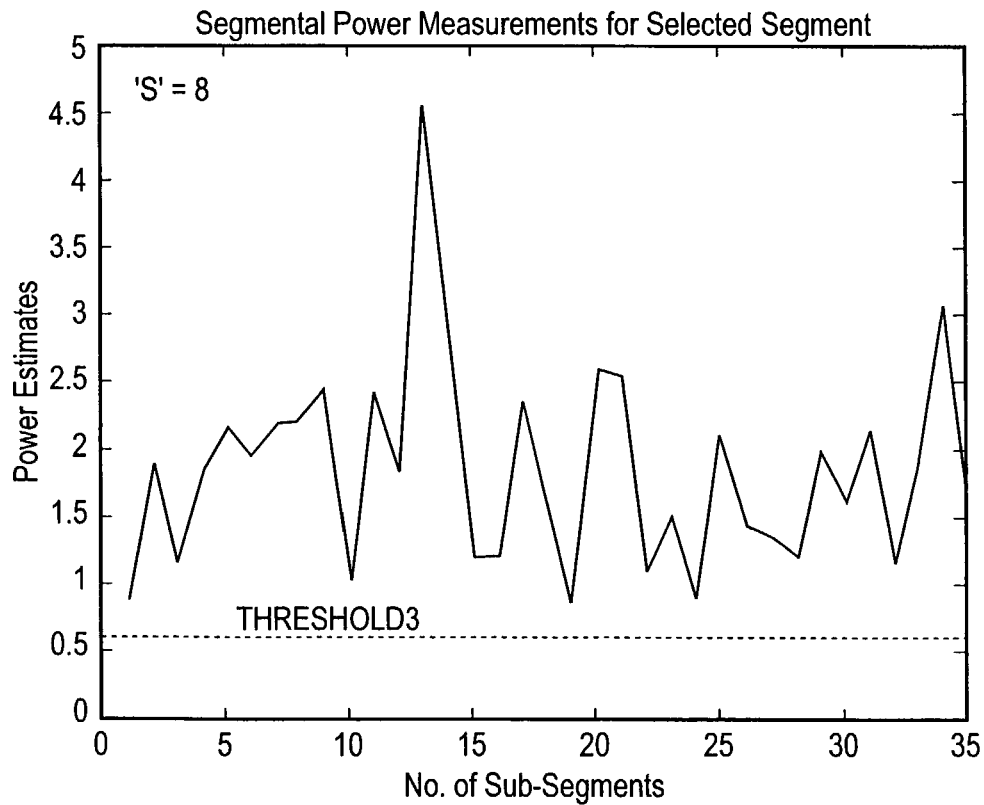
Fig. 18: Segmental Power Measurements for a 'False Trigger'

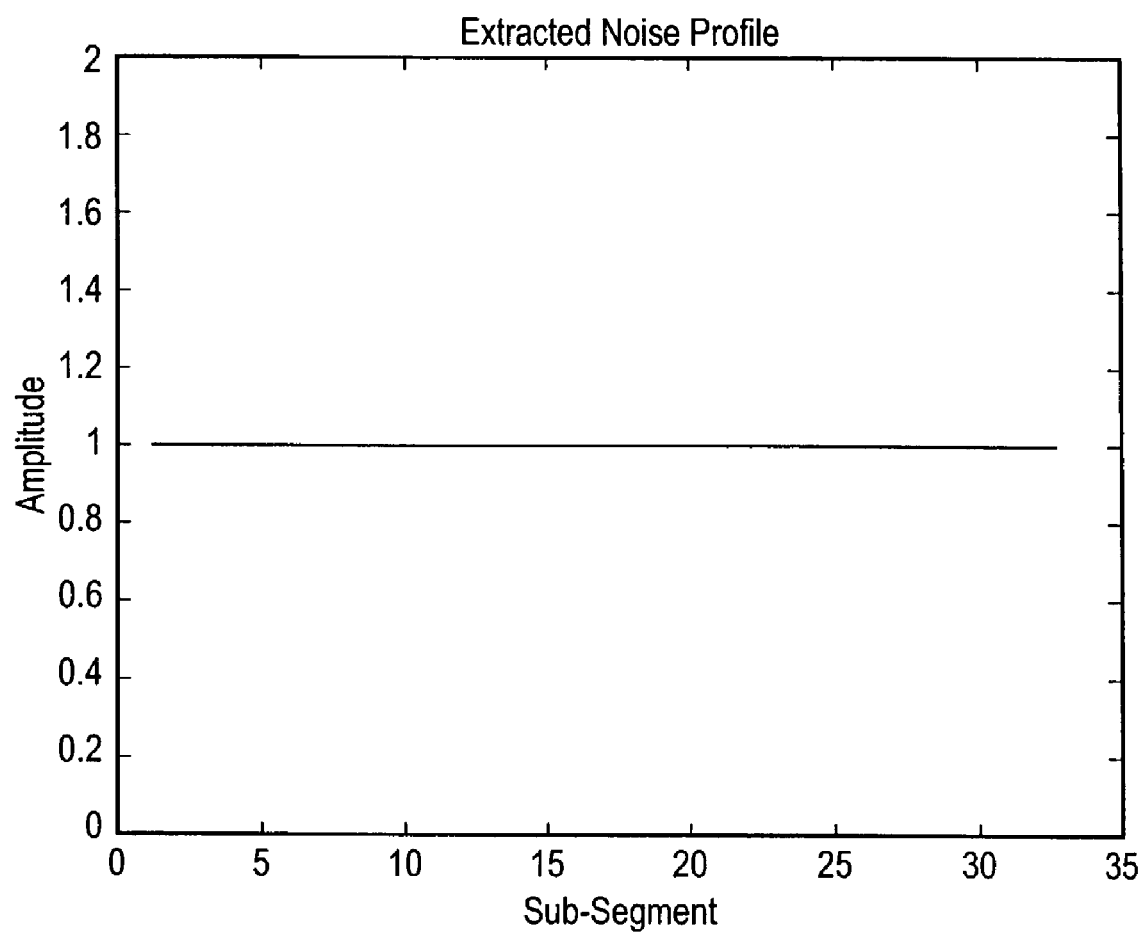
Fig. 19: Extracted Noise Profile for a 'False Trigger'

RECEIVER FOR A MULTI-CARRIER MODULATED SYMBOL

FIELD OF INVENTION

The present invention relates to receivers for multi-carrier modulated symbols. In some embodiments the symbol is an Orthogonal Frequency Division Multiplexed (OFDM) symbol, such as for example used in Digital Video Broadcasting (DVB).

BACKGROUND OF INVENTION

An example of a radio communications system in which data is communicated using multi-carrier modulated symbols is the Digital Video Broadcasting (DVB) system. The DVB system utilises a modulation scheme known as Coded Orthogonal Frequency Division Multiplexing (COFDM) which can be generally described as providing K narrow band carriers (where K is an integer) and modulating the data in parallel, each carrier communicating a Quadrature Amplitude Modulated (QAM) symbol. Since the data is communicated in parallel on the carriers, the same QAM-symbol may be communicated on each carrier for an extended period, which can be longer than a coherence time of the radio channel. By averaging over the extended period, the QAM-symbols modulated onto each carrier may be recovered in spite of time and frequency selective fading effects, which typically occur on radio channels.

To facilitate detection and recovery of the data at the receiver, the QAM-symbol are modulated onto each of the parallel carriers contemporaneously, so that in combination the modulated carriers form a COFDM symbol. The COFDM symbol therefore comprises a plurality of carriers each of which has been modulated contemporaneously with different QAM data symbols.

In some radio communications systems multi-carrier modulated symbols include pilot carriers, which communicate data-symbols known to the receiver. The pilot carriers provide a phase and timing reference to facilitate the detection and recovery of data at the receiver. For the Terrestrial version of the DVB standard (DVB-T) the multi-carrier symbol includes both Continuous Pilot (CP) carriers which remain at the same relative frequency position in the symbol and Scattered Pilots (SP). The SPs change their relative position in the symbol between successive symbols, providing a facility for estimating the impulse response of the channel via which the COFDM symbols are being communicated.

Although multi-carrier modulation schemes can provide a robust technique for communicating data in the presence of time and frequency selective fading and Gaussian noise, detecting and recovering data in the presence of impulsive burst noise induced at the receiver input presents a technical problem.

SUMMARY OF INVENTION

Accordingly, an object of the present invention is to provide a receiver which is operable to provide an improvement in the integrity of data detected from a multi-carrier modulated symbol.

Viewed from one aspect the present invention provides a receiver for receiving a multi-carrier-modulated symbol. The symbol includes a plurality of pilot carriers as well as a plurality of data bearing carriers. The receiver comprises a burst noise detection processor operable to detect the temporal position of a burst noise signal which may have corrupted the symbol, within a period occupied by the symbol, and a channel estimation processor operable to generate a decimated noise signal, caused by the burst noise signal, from recovered pilot carriers. An inverse Fourier transform of the decimated noise signal provides a plurality of estimated versions of the burst noise signal. A noise signal processor is operable to generate an estimate of the burst noise signal by identifying one of the plurality of periodically disposed estimated burst noise versions at the detected temporal location of the burst noise signal.

In some embodiments, the noise signal processor includes a burst selection processor operable to set the signal samples other than those of the estimated burst noise signal to zero. A Fourier transform processor performs a Fourier transform on the signal samples to recover a frequency domain version of the noise signal estimate, which can be cancelled from the symbol by a noise cancellation processor, before data is recovered from the symbol. In other embodiments the burst noise signal estimate may remain in the time domain and is cancelled by the noise cancellation processor from the COFDM symbol in the time domain.

Embodiments of the present invention utilise the presence of pilot carriers communicated with a multi-carrier symbol in order to generate an estimate of a burst noise signal so that the burst noise can be removed from the symbol before data detection. By comparing the pilot carriers from the recovered multi-carrier symbol with a known version of the pilot carriers, a frequency domain version of the burst noise signal is formed. However, the discontinuous (decimated) nature of the samples of the frequency domain version of the burst noise signal caused by the typically distributed nature of the pilot carriers has an effect of forming a plurality of periodically disposed versions of the burst noise signal in the time domain. By identifying one of these burst noise signals in the time domain from a relative temporal position of the burst noise signal, a time domain version of the burst noise signal can be provided. Furthermore, in some embodiments setting all other samples to zero, a Fourier transform of the resulting signal provides a frequency domain version of burst noise signal i.e interpolating the noise signal estimate Having identified the burst noise signal, the burst noise signal can be cancelled from the multi-carrier symbol, thereby providing an improvement in the integrity of the data detected and recovered. In particular, but not exclusively, an improvement is provided in the communication of television pictures which have been compression encoded in accordance with the Motion Picture Experts Group (MPEG) standard such as is the case with DVB-T. For MPEG encoded pictures a burst of noise can cause errors in the recovered data, which are visually disturbing in the received pictures.

The problem of burst noise detection can be exacerbated by the presence of an analogue to digital converter, which produces a discrete time version of the received multi-carrier symbol. When generating this discrete time version, the analogue domain signal is clipped to form the digital signal. The clipping has an effect of hindering the detection of a burst noise signal induced in the multi-carrier symbol at the receiver. As a result, detection of the presence of the burst noise signal is made more difficult.

For some embodiments the receiver is arranged to detect whether a burst is present or not and if not present, the receiver does not attempt to cancel the estimated burst noise signal from the multi-carrier symbol. Attempting to cancel a burst noise signal from the multi-carrier symbol when in fact none is present may have an effect of reducing the integrity of the recovered data and may have a catastrophic effect on MPEG communicated television images. Accordingly, embodiments of the present invention can include further techniques to not only isolate more thoroughly the burst noise signal in the time domain, but also to detect with an improved accuracy whether or not a burst noise signal has been induced in the multi-carrier symbol. According to these embodiments, at least one of the burst noise detection processor, the channel estimation processor, the noise signal processor or the noise cancellation processor is operable to estimate whether or not a burst noise signal is present in the received symbol. The estimated noise signal is then only cancelled from the symbol, if a burst noise signal is determined as being present.

Having identified the burst noise signal, the burst noise signal can be cancelled from the multi-carrier symbol, thereby providing an improvement in the integrity of the data detected and recovered. However, estimating a burst noise signal in accordance with the operation of a receiver embodying the invention and attempting to cancel this estimated burst noise signal when in fact none is present can have an effect of increasing noise in the received symbol. As such the integrity of the communicated data can be reduced rather than increased. Therefore, embodiments of the present invention provide an advantage in confirming the presence of a burst noise signal in the received symbol, in order to reduce the likelihood of increasing the noise in the symbol thereby increasing the integrity of the communicated data.

Various further aspects and features of the present invention are defined in the appended claims.

BRIEF DESCRIPTION OF THE DRAWINGS

Embodiments of the present invention will now be described by way of example only with reference to the accompanying drawings, where like elements bear the same references, wherein:

FIG. 2(a) is a schematic block diagram of a receiver for COFDM signals according to an embodiment of the present invention in which a burst noise suppression processor is operable in the time domain, and FIG. 2(b) is a schematic block diagram of a receiver for COFDM signals according to an embodiment of the present invention in which a burst noise suppression processor is operable in the frequency domain;

FIG. 3(a) is a graphical representation of a burst noise signal in the time domain, and FIG. 3(b) provides a representation of the time domain signal in the frequency domain;

FIG. 4(a) is a schematic block diagram of a burst noise suppression processor according to an embodiment of the invention appearing in FIG. 2(a) operable in the time domain; FIG. 4(b) is a schematic block diagram of a burst noise suppression processor according to an embodiment of the invention appearing in FIG. 2(b) operable in the frequency domain;

FIG. 5 is a flow diagram illustrating the operation of the burst noise suppression processor shown in FIG. 4;

FIG. 6 is a graphical representation of a COFDM symbol as received and formed in an FFT input buffer of the receiver of FIG. 2, showing in-phase and quadrature components and including a burst noise signal;

FIG. 7 is a graphical representation of a segmental noise power measurement of a COFDM symbol without the presence of a burst noise signal;

FIG. 8 is a graphical representation of a segmental noise power measurement of the COFDM symbol shown in FIG. 6 in which a burst noise signal has been induced;

FIG. 9 provides a graphical representation of a typical histogram of peak-to-average power ratios for example COFDM symbols without a burst noise signal;

FIG. 10 provides a graphical representation of a percentage of the COFDM symbols shown in FIG. 9 having a particular peak-to-average power ratio with respect to a predetermined threshold.

FIG. 11 is a graphical representation of a typical decimating signal in the frequency domain;

FIG. 12 is a graphical representation of the decimating signal shown in FIG. 11 in the time domain;

FIG. 13 is a graphical representation of a decimated noise signal generated from the received pilot carrier signals in the frequency domain;

FIG. 14 is a graphical representation of the decimated noise signal of FIG. 13 in the time domain;

FIG. 15 is a graphical representation of a segment of the decimated noise signal of FIG. 14 selected in accordance with an estimate of the time and duration of the burst noise signal as illustrated in FIG. 6;

FIG. 17 is a graphical representation of an extracted noise profile determined from the segmental noise power measurement represented in FIG. 16;

FIG. 18 is a graphical representation of a segmental noise power measurement of a selected segment of a decimated noise signal when no burst noise signal is present; and FIG. 19 is a graphical representation of an extracted noise profile determined from the segmented noise power measurement represented in FIG. 18.

DESCRIPTION OF PREFERRED EMBODIMENTS

1 COFDM Receiver

An example embodiment of the present invention will now be described with reference to detecting and recovering data from a COFDM symbol produced for example in accordance with the Digital Video Broadcasting (DVB) standard. The DVB standard is disclosed in a publication by the European telecommunications standards institute number EN300744 version 1.1.2 (1997-08) and entitled "Digital Video Broadcasting (DVB); Frame Structure Channel Coding And Modulation For Digital Terrestrial Television".

Figure 1:
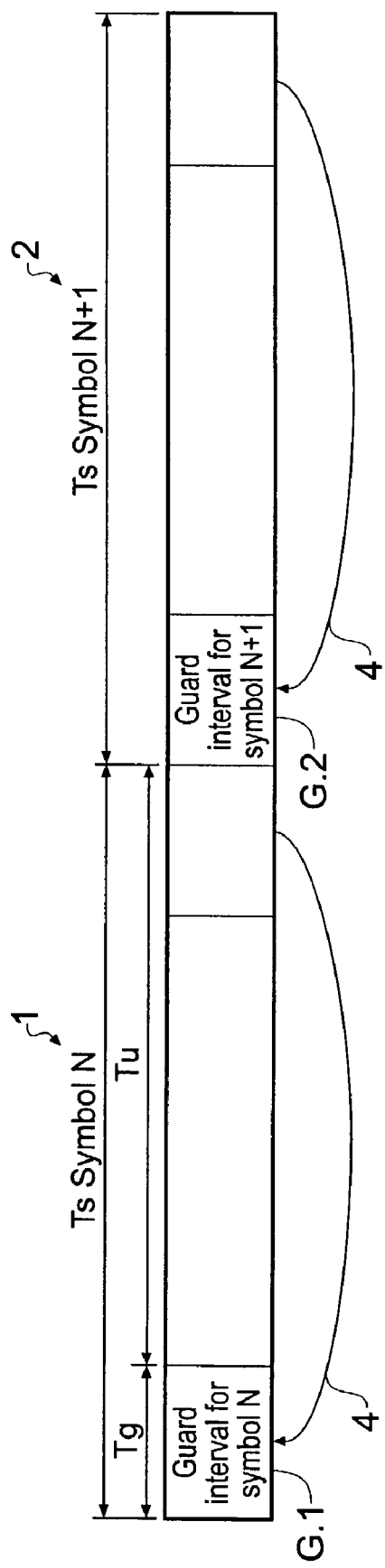
FIG. 1 is a schematic representation of two successive COFDM symbols.

As already explained, a COFDM symbol which is modulated in accordance with the DVB standard is generated by modulating K narrow band carriers in parallel with the data to be communicated. Generally, as disclosed in the above referenced ETSI publication, the COFDM symbols may be formed using an Inverse Fourier Transform. A diagram representing the form of the COFDM symbols in the time domain is shown in FIG. 1. In FIG. 1 two COFDM symbols represented as blocks 1, 2 are shown, as they would be transmitted by a DVB transmitter with time progressing from left to right across the page. Each symbol conveys a segment of data, which has modulated the K narrow band carriers. The symbols include guard intervals for facilitating synchronisation of a receiver to each COFDM symbol. As illustrated by the arrow 4, the guard intervals are comprised of data samples copied from another part of the COFDM symbol. In order to recover each segment of data from each OFDM symbol, the symbol is demodulated (using an FFT operation) and then each carrier is demodulated to recover the data conveyed by that carrier. In order to provide some protection for the integrity of the communicated data via the COFDM symbols, error correction encoding is used in combination with interleaving.

The error correction encoding in combination with the interleaving is particularly effective against Gaussian noise. However, as will be explained shortly, the error protection encoding and interleaving does not provide appropriate protection against burst or impulsive noise which is induced at the receiver input.

A receiver for detecting and recovering data from a COFDM symbol in accordance with an embodiment of the present invention is shown in FIG. 2a. The receiver shown in FIG. 2a is operable to detect and synchronise to each COFDM symbol in order to recover the data modulated onto each symbol. Examples of techniques for performing synchronisation to the COFDM symbol are disclosed in co-pending UK patent applications, Ser. No.0027423.3, 0027424.2 and 0115061.4. As will be explained shortly the receiver shown in FIG. 2a includes a burst noise suppression processor, which is operable to cancel a burst noise signal from a COFDM symbol in the time domain. FIG. 2b provides an alternative embodiment to the receiver shown in FIG. 2a in which a burst noise signal is cancelled from the symbol in the frequency domain.

In FIG. 2a an analogue to digital converter 10 is arranged to receive an intermediate frequency (IF) signal representative of a detected radio signal on which the COFDM symbol has been modulated. The receiver also includes down conversion means operable to convert the radio frequency signal into an intermediate frequency signal, which is fed to the analogue to digital converter 10 via an input 12. Thus it will be appreciated that the receiver may also include a radio frequency receiving and down converting means which are not shown in FIG. 2. After being analogue to digitally converted the received signal is processed by an intermediate frequency to base band conversion means 14 before being processed by a re-sampling and carrier offset correction processor 16. The re-sampling and carrier offset correction processor is arranged to track in the frequency domain the K carriers of the COFDM symbol. The base band received signal samples are then fed to a Fast Fourier transform processor 18 which serves to facilitate demodulation of the OFDM symbol. The data is then recovered from the frequency domain signal samples by a post FFT processor 20, which includes a de-interleaver. The data is then fed to a forward error correction processor 22 which operates to decode the error correction encoded data to finally produce the recovered data at an output 24.

Also shown in FIG. 2a is a burst noise suppression processor 30 which, is arranged to receive a time domain version of the COFDM symbols via input channel 28. As will be explained shortly, the burst noise suppression processor 30 operates to detect and alleviate the effects of impulsive burst noise signals, which may be induced in the COFDM symbols at the receiver. As mentioned above the embodiment shown in FIG. 2a is arranged to cancel the burst noise signal in the time domain. The alternative embodiment shown FIG. 2b is arranged to cancel the burst noise signal in the frequency domain. FIG. 2b corresponds substantially to FIG. 2a, and so only the differences between the two diagrams will be explained.

In FIG. 2b, the burst noise suppression processor 30' comprises a noise suppression processor 31 and a channel estimation and correction processor 60'. As will be explained shortly, some of the functions performed by the blocks of the receiver can be used to perform some of the functions required for burst noise suppression. For example, the channel estimation and correction processor 60' is required for estimating the channel state information to facilitate demodulation and detection of the data from the COFDM symbol. Since the processed COFDM symbol is in the frequency domain, a de-mapper 42 is required to recover the data from the symbol processed by the burst suppression processor. The channel state information is recovered from pilot signals communicated with the symbol. However the pilot signals are also used to estimate the burst noise signal. Accordingly the channel estimation and correction processor 60' forms part of the burst noise suppression processor 30'. The burst noise suppression processor 30' receives the COFDM symbol in the time domain via channel 34 and in the frequency domain from the output of the FFT processor via connecting channel 35. The burst noise suppression processor 30, 30' according to the first and second embodiments will now be explained in more detail.

2 Impulsive Interference

As with many communications systems measures introduced to preserve the integrity of the communicated data are directed towards the Gaussian stochastic process. Consequently the performance of a COFDM receiver can be significantly degraded by the occurrence of impulsive noise.

The source of impulsive noise may be either natural such as lightning, or man made. It might come from many sources such as relay contacts in switches, fluorescent lights or central heating thermostats; electromagnetic devices such as lifts, microwave ovens, printers, typewriters or copying machines; electronic apparatus such as computers, monitors and terminals; or transportation systems such as railroads, underground trains and car ignitions. The impulsive noise can be caused by single events (light switch) or continuous (tumble dryer). In terms of the emissions, it may either be conducted or radiated. The latter is more difficult to control whereas the use of better quality cabling, high quality connectors and careful routing of the cable might minimise the former.

Almost as soon as consumer Digital Terrestrial Television (DTT) receivers became available, installers began reporting large numbers of cases of interrupted reception, where pictures would frequently freeze or have errored blocks, and sound would mute or emit loud clicks and squeaks. Impulsive interference was quickly identified as the cause. Impulsive noise is an electrical interference that occurs in short bursts. The 'bursty' (narrow-duration) nature can cause a much more devastating effect than continuous noise of similar average power. The burst noise signal can be expressed using the following two basic equations:

$$x(t)=\delta(t) \text{ then } X(f)=1 \qquad (1)$$

$$x(t)=\delta(t-t_0) \text{ then } X(f)=\exp(-j2\pi f t_0) \qquad (2)$$

Equation (1) implies that the frequency content of a single impulse spans the whole bandwidth (theoretically from $-\infty$ to $+\infty$) and equation (2) indicates that any time-shift would correspond to a phase change in the frequency domain (exponential modulation). If the time signal, x(t), were composed of multiple impulses with different amplitudes, $a_i$ and time-shifts, $t_i$, the corresponding signal in the frequency domain would be a superposition of a number of sinusoids with different phases and amplitudes, as expressed in questions (3) below:

$$x(t)=\sum_{i=1}^{N} a_i \cdot \delta(t-t_i) \text{ then } X(f)=\sum_{i=1}^{N} a_i \cdot \exp(-j2\pi f t_i) \qquad (3)$$

FIG. 3 illustrates equation (3) pictorially for 'N' equal to 50 samples long (5 μsec at a sampling rate of 10 MSPS).

The burst power in the frequency domain can be considered as:

$$|X(f)|^2 = \sum_{i=1}^{N} |a_i|^2 \cdot |\exp(-j2\pi f t_i)|^2 = \sum_{i=1}^{N} |a_i|^2 \quad (4)$$

Thus, the important parameters are 'N' (burst duration) and '$a_i$' (impulse amplitudes within the burst).

In multi-carrier communication systems (such as COFDM), information is distributed between the carriers. Thus any carrier contamination may lead to loss of a significant amount of information. The partial suppression of impulsive interference might not provide a significant improvement. Moreover, the compression algorithms employed within the MPEG-2 encoders have made the transport stream very sensitive to channel errors. A small number of uncorrected errors may result in artefacts or picture freezing. It is therefore advantageous to attempt to try to remove a significant part of the noise in order to avoid such disruption.

The DVB-T standard is a pilot-assisted communication system. The system may lack the time interleaving but it provides a relatively generous amount of pilots per OFDM symbol. A total of 193 pilots (Continual Pilot (CP) carriers: 45, Scattered Pilot (SP) carriers: 131, Transmission Parameter Signalling (TPS): 17) and a total of 769 pilots (CP: 177, SP: 524, TPS: 68) in 8K mode, occupying 11.3% and 12.7% of total carriers in the 2K and 8K mode, respectively.

A well-designed channel estimation processor can make good use of these pilots to provide a reasonably accurate profile of the channel impulse response as well as the noise present, for each COFDM symbol. The pilots are spread across the full band (every 12 carriers). All that is then needed is accurate interpolation techniques to fill in the missing samples in between the pilot carriers. By buffering 4 consecutive COFDM symbols, the spacing between the pilots can be reduced to three making the interpolation easier and more accurate. Impulsive noise suppression, as performed by the burst noise suppression processor 30, 30' should be performed per symbol. The rapid variations of noise amplitudes (see FIG. 3(b) as an example) makes the task more complicated as any mismatch would increase the noise level rather than reducing it.

3 Impulsive Interference Detection 3.1 Introduction

The burst detection task is to mark the symbols that may contain high levels of burst noise as well as those with small levels. The former are much easier to perform than the latter when the detection is based on power measurements. If the burst duration were long and the burst power small, it may go undetected and thus cause a great deal of damage. It is also advantageous to be able to detect very narrow bursts (as small as 0.5 μsec) at low levels.

In preferred embodiments, the presence of a burst noise signal is confirmed as part of the operation of the burst noise suppression processor 30, 30'. As a result, there is a reduced likelihood of false triggering, which is identifying a desired signal as burst noise or identifying flat noise (Gaussian noise) as burst noise when in fact no burst noise is present. False triggering may lead to noise insertion, thereby reducing the integrity of the communicated data rather than increasing its integrity.

In FIG. 4a the burst noise suppression processor 30 of FIG. 2a, according to the first embodiment of the invention is illustrated as comprising a burst detector 50 and a channel estimation processor 60. The channel estimation processor 60, comprises an FFT processor 61 and a noise estimator 63. The burst detector 50 and the channel estimation processor 60 are arranged to receive the time domain COFDM symbols from the input channel 28 from the re-sampling and carrier offset processor 16 shown in FIG. 2a. As will be explained in the following section the burst noise suppression processor 30 performs a four-stage process to detect and suppress impulsive noise. The noise suppression processor 30 includes a noise signal processor 70 and a noise cancellation processor 80. The noise signal processor 70 comprises an inverse FFT processor 71 and a burst selection processor 73.

A burst suppression processor corresponding to the second embodiment is shown in FIG. 4b. In FIG. 4b, the burst noise suppression processor 30' comprises a channel estimation processor 60' and a noise signal processor 70'. The channel estimation processor includes a noise estimator 63', and an inverse FFT processor 61'. The noise signal processor 70' comprises a burst selection processor 73' and an FFT processor 71'.

As with FIG. 4a, the burst suppression processor 30' of FIG. 4b includes a noise cancellation processor 80' and a burst detector 50'. The noise cancellation processor 80' and the burst detector 50' operate in a similar way to the noise cancellation processor 80 and the burst detection processor 50 of FIG. 4a although estimation and cancellation of the noise is performed in the frequency domain rather than the time domain. The burst suppression processor 30' also includes a CSI update processor 90, which will be described shortly.

The operation of the burst noise suppression processors 30, 30' of FIGS. 4a and 4b are presented as a flow diagram shown in FIG. 5, which will be described, in the following paragraphs. The operation of the suppression processor 30' of FIG. 4b has more steps than the burst suppression processor 30 of FIG. 4a. The flow diagram in FIG. 5 therefore corresponds to the operation of the burst suppression processor 30' according to the second embodiment. The steps associated with operation of the first embodiment of FIG. 4a will be identified with reference to the operation of the second embodiment of FIG. 4b.

3.2 Burst Detection: Stage I

As shown in FIG. 5, in stage I of the operation of the burst noise suppression processor 30', the burst detection processor 50' is operable to generate an estimate of the temporal position of a burst of impulse noise with respect to a period occupied by the COFDM symbol. The burst detection processor 50 also performs the operation of stage I. The temporal position is estimated by calculating a segmental power measurement. The segmental power measurement is calculated by determining the signal power in small windows of 'S' samples. An example value for 'S' was found to be 16. If $X_i$ represents the data for one OFDM symbol, then;

$$POW(m) = \sum_{i=(m-1)*S}^{(m*S)-1} |X_i|^2; m = 1,2,3, \ldots, N/S \quad (5)$$

where N=2048 or N=8192

An example of a COFDM symbol within which a burst noise signal has been induced at the 500-th sample is shown in FIG. 6. A result of calculating the segmental power measurement within 16 sample windows is shown in FIG. 7 for an example COFDM symbol without a burst noise signal. FIG. 8 provides a representation of a segmental power measurement for the COFM symbol represented in FIG. 6 with the burst noise signal present.

The burst detection processor 50, 50' is operable to calculate the peak power ($POW_{max}$) to total average power ($POW_{mean}$) from the segmental power measurement. However, the power measurements around the peak value are removed before computing the total average power. This ensures that the average power is nearly the same for all cases i.e. when there are small bursts or large bursts present (in terms of both duration and amplitude).

$$POW_{max} = MAX\{POW\} \qquad (6)$$

$$POW_{mean} = 1/L * \sum_{\text{all m's except m's around } POW_{max}} POW(m); \qquad (7)$$

$L$ = Number of Power values used

The peak to average power ratio is then compared with a threshold (THRESHOLD1), and in accordance with the comparison the burst detection processor 50, 50' determines whether or not a burst is present. The threshold value THRESHOLD1 is selected by analysing a large clean IF signal and extracting the distribution of the peak to average power ratio. FIG. 9 shows a typical histogram of peak to average power ratio for a series of five sets of sixty-eight COFDM symbols forming five super-frames. The distribution of the peak to average power ratio shows a peak at approximately 1.8. However, there is some spreading. If the threshold THRESHOLD1 were set very low, at a point less than 1.8, there would be a great deal of false triggering. If the threshold THRESHOLD1 were set too high there would be the possibility of missing noisy bursts, particularly when the bursts have a low power.

FIG. 10 shows the percentage of peak-to-average power ratios that fall under a threshold when the threshold is varied between its minimum and maximum value. For a value of 2.0 an 80% rejection (or correct triggering) would be expected. This means that the probability of false triggering is 0.2 at this stage. This can be reduced further by including further steps in other embodiments, which confirm the conclusion determined at this stage as to whether or not a burst noise signal is present.

$$P = \left[\frac{POW_{max}}{POW_{mean}}\right] \qquad (8)$$

$$THRESHOLD1 = 2.0 \qquad (9)$$

IF (P>THRESHOLD1) then Burst Detected (Proceed to Stage II)

ELSE Burst Detection terminates and no attempt is made to remove a burst noise signal from the COFDM signal. If noise is detected, then stage I provides a coarse position for the burst noise signal, which is communicated by the burst detection processor 50', 50 to the channel estimation processor 60, 60' and the noise processor 70, 70' via a channel 54, 54'.

3.3 Burst Detection: Stage II

In stage II the burst detection processor 50, 50' performs a further analysis on the segmental power measurement to provide a further verification that there is a burst noise signal present in the COFDM symbol. To this end a second threshold (THRESHOLD2) is set in accordance with the following relationship;

$$THRESHOLD2 = \beta * POW_{max} \qquad (10)$$

where β is a value between 0.85 and 0.95

The number of power measurement values that exceed THRESHOLD2 are then computed as illustrated in FIG. 8. For a clean OFDM signal that has a Gaussian noise signal added to it, the number of segmented power samples crossing the second threshold THRESHOLD2 would be large, as illustrated in FIG. 7. However as shown in FIG. 8, the number of crossings of the threshold THRESHOLD2 is small for the case where a burst noise signal is present in the COFDM symbol.

When impulsive noise is added to the signal, the signal's peak power, on average, will increase thus raising the threshold value. By putting a limit on the spread of threshold crossings ('MaxSpread') we can further reduce the probability of false triggering.

Sx=position of last thresold crossing−position of first threshold crossing (11)

IF (Sx>MaxSpread) then the burst detection processor 50, 50' determines that no burst noise signal is present and terminates and no attempt is made to cancel noise from the COFDM symbol.

ELSE the burst detection processor determines that a burst is present and a signal is communicated to channel estimation processor 60, 60' and the noise signal processor 70, 70' via the connecting channel 54, 54', providing an estimate of the location and duration of the burst noise signal.

For the example of detecting a burst noise signal present in a COFDM symbol, then the MaxSpread threshold would be set as follows:

$$MaxSpread = 2\left[\frac{N}{D*S}\right]; \qquad (12)$$

where N=2048 or 8192, S=16, and D=Distance between pilot carriers (=12 in DVB-T Standard).

If as part of the stage II process, the burst detection processor 50, 50' detects the presence of a burst noise signal, then a coarse value for the burst duration is also detected as illustrated in FIG. 8. The stage III of the burst noise signal detection process uses this coarse value to provide more accurate information about burst duration and location after re-confirming the presence of a burst noise signal. However, stage III differs depending on whether noise cancellation is performed in the time or the frequency domain as performed by the first and the second embodiments of FIGS. 4a and 4b respectively.

3.4 Stage III

The stage III in effect filters out the COFDM signal so that all that remains is the burst noise signal. It is then possible to confirm the presence of noise burst with greater confidence and to extract the burst characteristics (location and duration) much more accurately.

In a pilot assisted communication system such as DVB-T, the pilot carriers are spread right across the full band-width. The channel estimation processor 60, 60' is operable to utilise the Scattered Pilots (SPs) and the Continuous Pilots (CPs) to provide a long-term and short-term estimate of the impulse response of the channel through which the radio signal has passed (channel state information). Accordingly, the channel estimation processor 60, 60' can compensate for the long-term and short-term channel state estimates. However, in order to suppress the burst noise, an estimate must be provided of the burst noise amplitude and complex phase at each respective sample throughout the duration of the burst noise signal. The phase of each complex sample is required because data is communicated on the COFDM carrier signals using phase modulation (QAM). Accordingly, the phase shifts to the carrier signals caused by the burst noise signal must be detected and corrected to improve the integrity of the communicated data.

The SPs and CPs in the COFDM symbol provided a facility for estimating the short term and long-term state of the channel. However the distribution and configuration of the SPs and CPs are not well suited to detecting a burst noise signal which is induced at the receiver. As explained in the following paragraphs, the CPs and SPs can provide a facility for providing a periodic or decimated estimate of the burst noise signal. This estimate is performed by the noise estimator 63, 63' of the channel estimation processor 60, 60' in the first and the second embodiments. The noise estimator 63, 63' processes received pilot carriers in the frequency domain. Accordingly since the channel estimation processor 63 of the first embodiment receives the COFDM symbol in the time domain the FFT processor 61 is provided to convert the time domain signal to the frequency domain to provide access to the pilot carriers. In contrast the channel estimation processor 63' for the second embodiment receives the COFDM symbol in the frequency domain and so no FFT is required at this point.

It is possible to estimate the noise at pilot carriers and construct a decimated noise signal, due to the fact that there are data carriers in between the pilot carriers. Considering the basic principles of discrete-time signal processing, if the pilot carriers were separated by 'D' carriers (samples), the Discrete Fourier Transform (Inverse DFT in this case) would yield a repetition of the burst noise at 'D' locations. As such in stage III of the operation of the burst noise suppression processor 30, 30' the following operations are performed by the noise estimator 63, 63':

1. Construct the decimated noise signal by correlating the pilot carriers (CPs and SPs) from the received COFDM symbol with a reproduced version of the pilot carriers known at the receiver.
2. Perform an inverse FFT on the decimated burst noise signal of the pilot carriers with the reproduced known versions.
3. Use the burst position and duration information provided by stage II to select one of the plurality of 'D' periodically disposed segments from the time domain.
4. Perform segmental power measurements on the selected segment to extract accurate information on the burst noise signal.

Before explaining the operation of the burst noise suppression processor 30, 30' the theory behind the operation will be explained. A decimation process may be considered as the multiplication of a signal, X(f), by another signal of the same length, D(f), that has a value of 1 every 'D' samples ('D' is the decimation ratio) with zero value samples in-between. A known signal-processing rule is that 'multiplication' in one domain corresponds to 'convolution' in another. That is, if the decimation process took place in the frequency domain, the time domain representation of the full signal, x(t), convolves with the time domain representation of the decimating signal, d(t). This is expressed mathematically below:

$$X_d(f)=X(f).D(f) \rightarrow x_d(t)=x(t)*d(t) \quad (13)$$

FIG. 11 shows a typical decimating signal, D(f), with a length of 1705 samples (number of carriers in '2 k' mode). The corresponding time domain representation, d(t) is shown in FIG. 12.

Consider the second part of equation (13) and the signal shown in FIG. 12. From the representation in FIG. 12, it can be seen that the signal, x(t), would be expected to be repeated 'D' times (D=12, in this case) after being convolved with the 'D' narrow impulses separated by 'sequence length/D' samples (i.e. 1705/12=142, in this case). If the signal, x(t), were of narrow duration (such as burst noise) and the duration were limited to 142 samples, each replica would remain within the grid size of 142. Otherwise, the replicas would alias together. To illustrate how the burst noise signal might be detected, consider the COFDM signal having a burst noise signal illustrated in FIG. 8. The four steps mentioned above for the stage III process are performed by the noise estimator 63, 63' and the noise signal processor 70, 70' as follows:

Step 1. Construct the decimated noise signal: FIG. 13 illustrates the corresponding noise estimate values provided by correlating the reproduced pilot carriers with the received pilot carriers. A noise value sample is provided at each of the CP carriers separated by 11 zeros (corresponding to number of data carriers).

Step 2. Perform inverse DFT: FIG. 14 shows the decimated noise signal after performing an inverse DFT operation. There are 12 replicas of the burst as explained above. For the first embodiment, the inverse FFT is performed by the inverse FFT processor 71 within the noise signal processor 70, because the decimated noise signal is received from the noise estimator of the channel estimation processor 60 in the frequency domain. For the second embodiment, the inverse FFT is performed by the inverse FFT processor 61' in the channel estimation processor 60'. However, the effect is the same, that is to provide a plurality of burst noise versions in the time domain to the burst selection processor 73, 73'.

Step 3. Use information provided by Stage II (burst position and duration) to select one of 'D' possible segments: As indicated by the dotted lines in FIG. 14, the $4^{th}$ segment has been selected from the duration and location information. The duration and location information is provided to the burst selection processor 73, 73' of the noise signal processor 70, 70' on the connecting channel 54, 54' from the burst detection processor 50, 50'. As indicated earlier, provided stages I and II operate correctly, this process has now removed the COFDM signal and it is now possible to analyse the remaining signal and make decisions.

Figure 16:
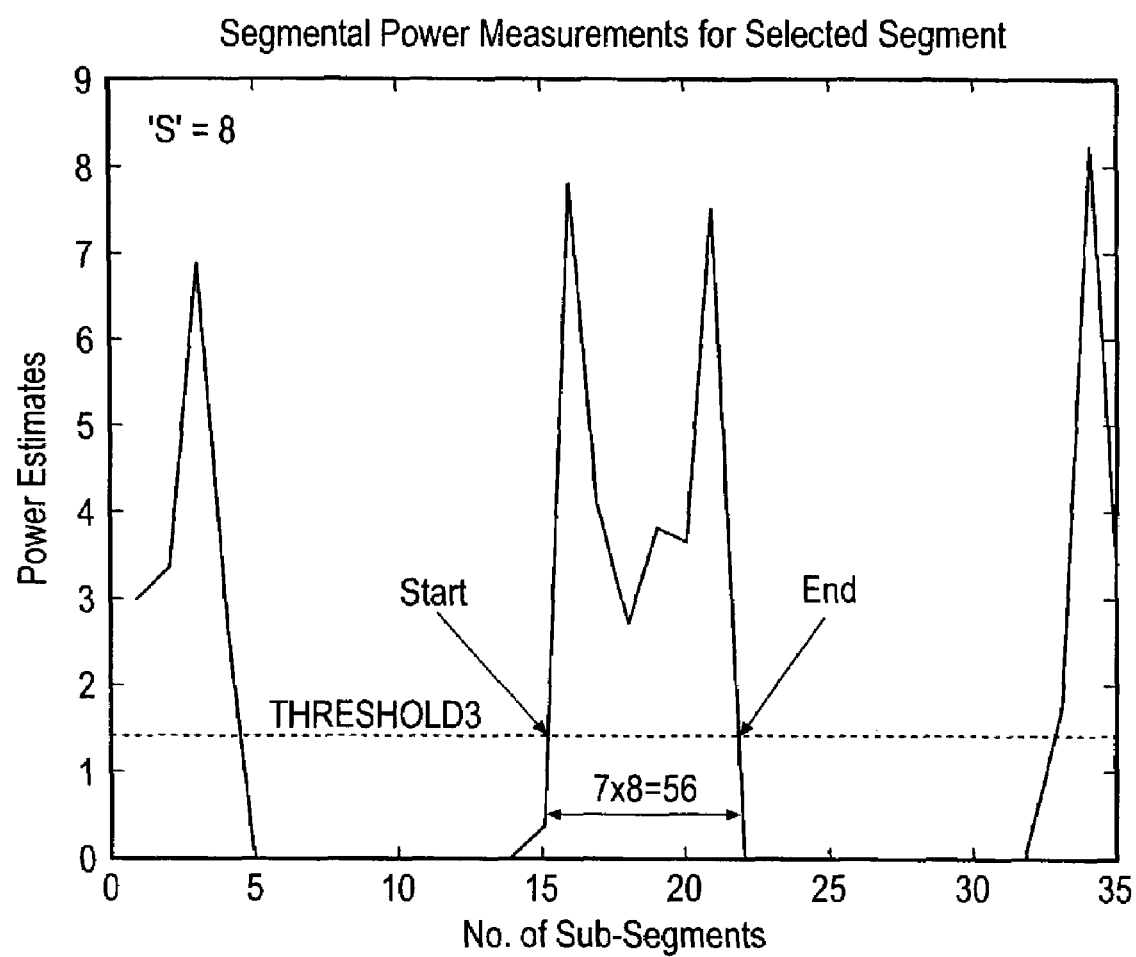
FIG. 16 is a graphical representation of a segmental noise power measurement of the selected segment of the decimated noise signal of FIG. 15.

Step 4. Perform segmental power measurements on the selected segment to extract accurate information on the burst: FIG. 15 shows the selected segment and FIG. 16 shows a corresponding segmental power measurements of the signal isolated in FIG. 15. These operations are performed by the burst selection processor 73, 73'. The segmental power measurements are performed according to Equation (1) where 'S' can now be smaller (typically 8) to provide better accuracy and N here is the size of the selected segment. At this point an estimate of the burst noise signal has been provided which can be cancelled from the COFDM symbol by the cancellation processor 80, 80'. However, in some embodiments further steps are included in order to refine the estimate of the burst noise signal and to confirm that a burst noise signal is indeed present so as to further reduce the likelihood of false triggering.

In some embodiments, the stage III process includes a further step to refine an estimate of the duration of the burst noise signal in the time domain. To this end a third threshold level THRESHOLD3 is now set up, as illustrated in FIG. 16. The third threshold THRESHOLD3 is set in accordance with the following expression;

$$THRESHOLD3 = \lambda^*(POW_{max} - POW_{mean}); \qquad (11)$$

where λ is a value between 0.125 and 0.25 and $POW_{max}$ and $POW_{mean}$ are maximum and mean values of segmental power measurements, respectively.

Here, with COFDM signal removed, we expect to see samples of very small amplitude (nearly zero) in-between the bursts. Thus, a low threshold is set (THRESHOLD3) and used to extract the noise burst profile. FIG. 17 shows the extracted noise profile for the selected segment.

The extracted noise profile facilitates identification of the 'high' to 'low' transition (possible burst ends) and the 'low' to 'high' transitions (possible burst starts) by detecting '1' or '−1' respectively. The lowest value of possible 'starts' and the highest value of possible 'ends' would yield the fine tuned parameters.

If the two previous stages had provided incorrect information ('False Triggering'), the segmental power measurements may look as shown in FIG. 18. The threshold THRESHOLD3 is set up as before and the noise profile extracted as shown in FIG. 19. The burst selection processor 73, 73' is arranged to detect a value of substantially '1' right across the selected segment, which suggests the presence of flat noise (Gaussian Noise) rather than impulsive noise. The burst selection processor 73, 73' can therefore detect whether or not a burst noise signal is present or not by comparing the noise profile with appropriate thresholds. If the burst selection processor 73, 73' does not confirm the presence of burst noise, then the burst detection process terminates and the cancellation processor 80, 80' does not attempt to cancel the burst noise signal otherwise estimated.

3.5 Stage IV

In the second embodiment of the invention, once the burst noise signal is detected, the cancellation processor 80 is arranged to remove the noise from the carriers (data and pilot carriers) which are effected by the burst noise. However, to improve the estimation of Channel State Information (CSI) provided using the pilot carriers (CPs and the SPs), the brst suppression processor 30' includes a CSI update processor 90 which is arranged to re-estimate the CSI. The pilot carriers (SPs and CPs) are used to estimate the CSI after the burst noise has been removed from the COFDM symbol. To this end, the CSI update processor 90 is provided to receive the output from the noise cancellation processor 80'. Otherwise, the channel estimation process would assume the presence of noise even though noise has been removed. Consequently, incorrect CSI could be generated, which would mislead the de-modulator (de-mapper 42) of FIG. 2*b*.

In second embodiments the re-estimated CSI can be used to provide a further check as to whether a burst noise signal is present in the received COFDM symbol. After the estimated noise signal has been cancelled from the COFDM symbol by the cancellation processor 80', provided all the previous three stages had operated correctly (i.e. none false triggering), the noise power estimated using both the Continuous Pilot (CP) and Scattered Pilot (SP) carriers should have been reduced. Therefore, in the second embodiment the CSI update processor 90 provides a further check by comparing the noise power determined by the CPs and SPs before and after the burst noise signal has been cancelled. To this end, the CSI update processor 90 is arranged to receive the COFDM signal before the burst noise signal has been cancelled via the connecting channel 34 as well as the COFDM signal after the detected burst noise signal has been cancelled from the noise cancellation processor 90. The further check for the presence of the burst noise signal is determined in accordance with the following equations:

$$\text{IF} \left[ \frac{\text{Variance(Noise Estimates at CP(or SP)before Noise Removal)}}{\text{Variance(Noise Estimates at CP(or SP)after Noise Removal)}} \right] > 1 \qquad (14)$$

then Burst Noise Confirmed,

ELSE

Burst Noise not Detected(Burst Detection Terminates here).

If the CSI update processor 90 determines that no burst noise signal was present, then the original COFDM received symbol is allowed to pass to the output 32.

3.6 Other Embodiments

It will be appreciated that not all of the steps mentioned above are required in order to improve the integrity of information communicated on a multi-carrier modulated symbol having a plurality of pilot carriers. In some embodiments, the steps performed to estimate the presence or absence of a burst noise signal may be omitted. According to such embodiments a false triggering probability may be acceptable for some applications. However in other embodiments, such as for example where the multi-carrier-modulated symbol is arranged to communicate encoded video data, the burst noise detection steps may be included in order to reduce to a minimum the false triggering probability. Correspondingly, in other embodiments, steps explained above which have been introduced to refine the estimate of the burst noise signal duration may be omitted or selected as appropriate to suit a particular application.

Furthermore the CSI update processor 90 may be also provided in the first embodiment with corresponding changes made to the embodiment to provide signals in the appropriate time or frequency domain. Thus the stage IV process of confirming a reduction in the noise in the received COFDM symbol may be also performed in the first embodiment.

The invention claimed is:

1. A receiver for a multi-carrier modulated symbol, the multi-carrier modulated symbol including a plurality of pilot carriers modulated with a known signal and a plurality of data bearing carriers, the receiver comprising:
    a burst noise detection processor operable to detect a temporal position of a burst of noise which may have corrupted the symbol within a period occupied by the symbol;
    a channel estimation processor operable to generate a decimated noise signal corresponding to the burst noise signal from the recovered pilot carriers, and to perform an inverse Fourier transform on the decimated noise signal to produce a plurality of estimated versions of the burst noise signal;

a noise signal processor operable to generate an estimate of the burst noise signal by identifying one of the plurality of estimated burst noise versions at the detected temporal location of the burst noise signal; and a noise cancellation processor operable to cancel substantially the estimated burst noise signal from the symbol.

2. A receiver as claimed in claim 1, wherein the noise signal processor is operable to set signal samples other than the identified burst noise signal to zero and to perform a Fourier transform to recover a frequency domain version of the burst noise signal estimate, and the cancellation processor is operable to cancel the frequency domain version of the burst noise signal estimate from the symbol in the frequency domain.

3. A receiver as claimed in claim 1, wherein the burst noise detection processor is operable to estimate the power of samples of the symbol with respect to time and to identify a peak reference temporal position within the symbol period having the highest power and to determine the burst noise temporal position from the peak reference temporal position.

4. A receiver as claimed in claim 3, wherein the burst noise detection processor is operable to provide the noise cancellation processor with an estimate of whether or not a burst noise signal is present in the received symbol and if the burst noise detection processor determines that no burst noise signal is present, preventing the noise cancellation processor from cancelling the recovered noise signal from the symbol.

5. A receiver as claimed in claim 4, wherein the burst noise detection processor is operable to determine a temporal spread of calculated power samples having a pre-determined fraction of the highest power, and the interpolator is operable to select samples of the estimated burst noise signal with respect to the temporal spread, the burst noise temporal position being determined within the temporal spread.

6. A receiver as claimed in claim 5, wherein the burst noise detection processor is operable to determine that no burst noise signal is present in the received symbol if the temporal spread is greater than a pre-determined maximum duration related to a maximum resolvable time domain duration produced by a spacing of the pilot carriers in the frequency domain, and preventing the noise cancellation processor from cancelling the recovered noise signal from the symbol.

7. A receiver as claimed in claim 1, wherein the noise signal processor is operable to determine a start and an end position of the identified version of the burst noise signal by comparing the amplitude of the identified burst noise signal version at the peak reference temporal position with a predetermined threshold, identifying the start of the burst noise signal from a temporal location before the peak reference temporal position of the burst noise at which the noise signal amplitude falls below the threshold, identifying the end of the burst noise signal from a temporal location after the peak reference temporal position of the burst noise at which the noise signal amplitude falls below the pre-determined threshold, and the noise signal processor is operable to select samples of the estimated burst noise signal with respect to the start and the end of the burst noise signal.

8. A receiver as claimed in claim 3, wherein the burst noise detection processor is operable to estimate the power in the multi-carrier modulated symbol with respect to time, to calculate from the estimate of power with respect to time a peak to average power ratio of the burst signal with respect to time, to compare the peak to average power ratio with a predetermined threshold, the threshold being determined to reduce a likelihood of false burst noise detection, and if the peak to average power ratio is below the threshold, determining that no burst noise signal is present in the received symbol.

9. A receiver as claimed in claim 8, wherein the average power within the symbol is calculated from an average of the signal samples of the symbol without the signal samples within a pre-determined temporal window surrounding the highest power sample.

10. A receiver as claimed in claim 1, comprising a channel state processor operable to generate a symbol noise estimate before and after the recovered burst noise signal has been cancelled from the symbol and if the symbol noise estimate is greater after the burst noise signal has been cancelled, determining that no burst noise signal was present and outputting the symbol before cancelling the burst noise signal.

11. A receiver as claimed in claim 10, wherein the symbol noise estimate is generated by comparing the received pilot carriers with a reproduced version of the known pilot carrier before and after the burst noise signal is cancelled.

12. A receiver as claimed in claim 11, wherein the pilot carriers are disposed at continual pilot positions and scattered pilot positions, and the symbol noise estimate is generated by comparing at least one of the received continual pilots with at least one of a reproduced version of the continual pilots or the scattered pilots.

13. A receiver as claimed in claim 1, wherein the multi-carrier modulated symbol is generated in accordance with the Digital Video Broadcasting standard.

14. A receiver as claimed in claim 1, wherein at least one of the burst noise detection processor, the channel estimation processor, the noise signal processor or the noise cancellation processor is operable to estimate whether or not a burst noise signal is present in the received symbol and to cancel the recovered noise signal from the symbol, if a burst noise signal is determined as being present.

15. A receiver as claimed in claim 14, wherein the burst noise detection processor is operable to estimate from samples of the power in the symbol with respect to time a peak to average power ratio for the symbol by comparing the highest peak power sample of the symbol with the average power in the symbol, to compare the peak to average power ratio with a predetermined threshold, the threshold being determined to reduce a likelihood of false burst noise detection, and from the comparison to determine whether or not there is a burst noise signal present in the received symbol.

16. A receiver as claimed in claim 15, wherein the average power within the symbol is calculated from an average of the signal samples of the symbol without the signal samples within a pre-determined temporal window surrounding a temporal peak power reference position of the sample having the highest power.

17. A receiver as claimed in claim 15, wherein the burst noise detection processor is operable to determine a temporal spread of calculated power samples having a pre-determined fraction of the highest peak power, and if the temporal spread is greater than a pre-determined maximum duration, determining that no burst noise signal is present in the received symbol.

18. A receiver as claimed in claim 17, wherein the pre-determined maximum duration is related to a maximum resolvable duration in the time domain produced by a spacing of the pilot carriers in the frequency domain.

19. A receiver as claimed in claim 15, wherein the burst noise detection processor is operable to compare the estimated power samples of the received symbol with a pre-determined fraction of the highest power sample, and to determine whether a burst noise signal is present or not in accordance with a number of the estimated power samples which exceed the pre-determined fraction of the highest power sample.

20. A receiver as claimed in claim 14, comprising a channel state processor operable to generate a symbol noise estimate before and after the recovered burst noise signal has been cancelled from the symbol and if the symbol noise estimate is greater after the burst noise signal has been cancelled, determining that no burst noise signal was present and outputting the symbol before cancelling the burst noise signal.

21. A receiver as claimed in claim 20, wherein the symbol noise estimate is generated by comparing the received pilot carriers with a reproduced version of the known pilot carrier.

22. A receiver as claimed in claim 21, wherein the pilot carriers are disposed at continual pilot positions and scattered pilot positions, and the symbol noise estimate is generated by comparing at least one of the received continual and scattered pilots with a reproduced version of the continual and scattered pilots.

23. A receiver as claimed in claim 14, wherein the noise signal processor is operable
to compare the amplitude of the identified estimated burst noise signal with a threshold set with respect to a highest power sample of the estimated burst noise signal,
to determine a duration of the estimated burst noise signal from the comparison of the estimated burst noise amplitude with the threshold, and
to compare the duration with a pre-determined duration of a noise signal corresponding to substantially gaussian noise rather than burst noise, and from the comparison with the pre-determined duration determining whether or not a burst noise signal is present in the received symbol.

24. A burst noise processor for reducing burst noise in a received multi-carrier modulated symbol, the multi-carrier modulated symbol including a plurality of pilot carriers modulated with a known signal and a plurality of data bearing carriers, the burst noise processor comprising;
a burst noise detection processor operable to detect a temporal position of a burst of noise which may have corrupted the symbol within a period occupied by the symbol;
a channel estimation processor operable to generate a frequency domain decimated noise signal corresponding to the burst noise signal in the time domain from the recovered pilot carriers, and to perform an inverse Fourier transform on the decimated noise signal to produce a plurality of estimated versions of the burst noise signal; and
a noise signal processor operable to generate an estimate of the burst noise signal by identifying one of the plurality of estimated burst noise versions at the detected temporal location of the burst noise signal.

25. A burst noise processor as claimed in claim 24, comprising a noise cancellation processor operable to cancel substantially the estimated burst noise signal from the symbol, wherein the noise signal processor is operable to set signal samples other than the identified burst noise signal to zero and performing a Fourier transform to recover a frequency domain version of the burst noise signal, and the cancellation processor is operable to cancel the frequency domain version of the burst noise signal from the symbol in the frequency domain.

26. A burst noise processor as claimed in claim 24, wherein the burst noise detection processor is operable to estimate the power of samples of the symbol with respect to time and to identify a peak reference temporal position within the symbol period having the highest peak power and to determine the burst noise temporal position from the peak reference temporal position.

27. A burst noise processor as claimed in claim 26, wherein the burst noise detection processor is operable to provide the noise cancellation processor with an estimate of whether or not a burst noise signal is present in the received symbol and if the burst noise detection processor determines that no burst noise signal is present, preventing the noise cancellation processor from cancelling the recovered noise signal from the symbol.

28. A burst noise processor as claimed in claim 24, wherein at least one of the burst noise detection processor, the channel estimation processor, the noise cancellation processor or the noise signal processor is operable to estimate whether or not a burst noise signal is present in the received symbol and to cancel the recovered noise signal from the symbol, if a burst noise signal is determined as being present.

29. A burst noise processor as claimed in claim 28, wherein the burst noise detection processor is operable to estimate from samples of the power in the symbol with respect to time a peak to average power ratio for the symbol by comparing the highest peak power sample of the symbol with the average power in the symbol, to compare the peak to average power ratio with a predetermined threshold, the threshold being determined to reduce a likelihood of false burst noise detection, and from the comparison to determine whether or nor there is a burst noise signal present in the received symbol.

30. A burst noise processor as claimed in claim 28, wherein the burst noise detection processor is operable to compare the estimated power samples of the received symbol with a pre-determined fraction of the highest power sample, and to determine whether a burst noise signal is present or not in accordance with a number of the estimated power samples which exceed the pre-determined fraction of the highest power sample.

31. A burst noise processor as claimed in claim 28, comprising a channel state processor operable to generate a symbol noise estimate before and after the recovered burst noise signal has been cancelled from the symbol and if the estimated symbol noise is greater after the burst noise signal has been cancelled, determining that no burst noise signal was present and outputting the symbol before cancelling the burst noise signal.

32. A burst noise processor as claimed in claim 28, wherein the noise signal processor is operable
to compare the amplitude of the identified estimated burst noise signal with a threshold set with respect to the highest power sample of the estimated burst noise signal,
to determine a duration of the estimated burst noise signal from the comparison of the estimated burst noise amplitude with the threshold, and
to compare the duration with a pre-determined duration of a noise signal corresponding to substantially gaussian noise rather than burst noise, and from the comparison with the pre-determined duration determining whether or not a burst noise signal is present in the received symbol.

33. A method of reducing burst noise in a multi-carrier modulated symbol, the multi-carrier modulated symbol including a plurality of pilot carriers modulated with a known signal and a plurality of data bearing carriers, the method comprising:
  detecting the temporal position of a burst of noise which may have corrupted the symbol within a period occupied by the symbol;
  generating a decimated noise signal corresponding to the burst noise signal from the recovered pilot carriers;
  performing an inverse Fourier transform of the decimated noise signal to produce a plurality of estimated versions of the burst noise signal;
  generating an estimate of the burst noise signal by identifying one of the plurality of estimated burst noise versions at the detected temporal location of the burst noise signal; and
  cancelling substantially the estimated burst noise signal from the symbol.

34. A method of reducing burst noise in a multi-carrier modulated symbol, as claimed in claim 33, comprising
  estimating whether or not a burst noise signal is present in the received symbol, and in accordance with the estimate cancelling the recovered noise signal from the symbol, if a burst noise signal is determined as being present.

35. A receiver for a multi-carrier modulated symbol, the multi-carrier modulated symbol including a plurality of pilot carriers modulated with a known signal and a plurality of data bearing carriers, the receiver comprising:
  means for detecting the temporal position of a burst of noise which may have corrupted the symbol within a period occupied by the symbol;
  means for generating a decimated noise signal corresponding to the burst noise signal from the recovered pilot carriers;
  means for performing an inverse Fourier transform of the decimated noise signal to produce a plurality of estimated versions of the burst noise signal;
  means for generating an estimate of the burst noise signal by identifying one of the plurality of estimated burst noise versions at the detected temporal location of the burst noise signal; and
  means for cancelling substantially the estimated burst noise signal from the symbol.

36. A receiver as claimed in claim 35, comprising
  means for estimating whether or not a burst noise signal is present in the received symbol, and in accordance with the estimate cancelling the recovered noise signal from the symbol, if a burst noise signal is determined as being present.

* * * * *